United States Patent
Damnjanovic et al.

(10) Patent No.: US 11,937,144 B2
(45) Date of Patent: Mar. 19, 2024

(54) COOPERATIVE USER EQUIPMENT SWITCHING

(71) Applicant: QUALCOMM Incorporated, San Diego, CA (US)

(72) Inventors: Aleksandar Damnjanovic, Del Mar, CA (US); Andrei Dragos Radulescu, San Diego, CA (US); Mostafa Khoshnevisan, San Diego, CA (US); Yan Zhou, San Diego, CA (US); Tao Luo, San Diego, CA (US); Xiaoxia Zhang, San Diego, CA (US); Jelena Damnjanovic, Del Mar, CA (US); Rajat Prakash, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 17/370,563

(22) Filed: Jul. 8, 2021

(65) Prior Publication Data

US 2023/0008727 A1 Jan. 12, 2023

(51) Int. Cl.
*H04W 36/30* (2009.01)
*H04B 7/06* (2006.01)
*H04W 88/04* (2009.01)

(52) U.S. Cl.
CPC .......... *H04W 36/30* (2013.01); *H04B 7/0695* (2013.01); *H04W 88/04* (2013.01)

(58) Field of Classification Search
CPC ..... H04W 36/30; H04W 88/04; H04W 36/03; H04B 7/0695

(Continued)

(56) References Cited

U.S. PATENT DOCUMENTS 8,046,408 B2 * 10/2011 Torabi ............... G06F 3/011
709/204
8,437,789 B2 * 5/2013 Kim ................. H04B 7/0456
455/450

(Continued)

FOREIGN PATENT DOCUMENTS

EP 2887755 A1 6/2015
WO WO-2012102546 A2 8/2012

OTHER PUBLICATIONS

Huawei, et al., "Further Views on Rel-17 Work Area on NR Sidelink Enhancements for V2X and other Use Cases", 3GPP TSG RAN Meeting #85, RP-191831, 3GPP, Mobile Competence Centre, 650, Route Des Lucioles, F-06921 Sophia-Antipolis Cedex, France, vol. TSG RAN No. Newport Beach, USA, Sep. 16, 2019-Sep. 20, 2019, Sep. 9, 2019, XP051782380, 13 Pages, p. 5, paragraph 2.1.2.3, Sec. 2.2.2, fig. 9, sec. "2.2: Relay and SL assisted Uu communications data transmission".

(Continued)

*Primary Examiner* — Amancio Gonzalez
(74) *Attorney, Agent, or Firm* — Holland & Hart LLP

(57) ABSTRACT

Methods, systems, and devices for wireless communications are described. A first device may cooperate with a second device to form a virtual device configured to communicate with a radio access network. The virtual device may appear as a single device from the perspective of the radio access network. Subsequently, a third device may be identified for replacing the second device within the virtual device. Based on the third device being identified, procedures for handing over communications from the second device to the third device may be executed. The procedures may include a beam management procedure, a random-access procedure, a mobility management procedure, or any combination thereof.

30 Claims, 13 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 9,001,754 | B2* | 4/2015 | Kato | H04W 36/0072 |
| | | | | 370/328 |
| 9,078,186 | B2* | 7/2015 | Cho | H04W 36/08 |
| 9,078,189 | B2* | 7/2015 | Jang | H04W 36/38 |
| 9,363,842 | B2* | 6/2016 | Cho | H04B 7/026 |
| 9,386,618 | B2* | 7/2016 | Al-Shalash | H04W 76/12 |
| 9,681,311 | B2* | 6/2017 | Hyde | H04B 7/026 |
| 9,762,344 | B2* | 9/2017 | Ko | H04L 5/0048 |
| 9,820,302 | B2* | 11/2017 | Choi | H04W 74/04 |
| 10,477,488 | B2* | 11/2019 | Hong | H04W 52/46 |
| 10,547,354 | B2* | 1/2020 | Tooher | H04B 7/026 |
| 10,568,153 | B2* | 2/2020 | Baligh | H04W 40/22 |
| 10,952,031 | B2* | 3/2021 | Maaref | H04L 5/0033 |
| 11,476,899 | B2* | 10/2022 | Ma | H04B 7/026 |
| 11,492,004 | B2* | 11/2022 | Ito | B60W 60/0055 |
| 11,502,987 | B2* | 11/2022 | Lin | H04L 65/1073 |
| 11,751,284 | B2* | 9/2023 | Huang | H04W 88/04 |
| | | | | 370/315 |
| 2011/0176477 | A1* | 7/2011 | Lee | H04B 7/022 |
| | | | | 370/332 |
| 2013/0064213 | A1* | 3/2013 | Park | H04W 76/14 |
| | | | | 370/329 |
| 2013/0107851 | A1* | 5/2013 | Park | H04W 74/002 |
| | | | | 370/329 |
| 2013/0215860 | A1* | 8/2013 | Cho | H04B 7/0689 |
| | | | | 370/329 |
| 2013/0331090 | A1* | 12/2013 | Kim | H04W 76/14 |
| | | | | 455/422.1 |
| 2014/0094148 | A1* | 4/2014 | Lang | H04L 41/50 |
| | | | | 455/411 |
| 2014/0098731 | A1 | 4/2014 | Maaref et al. | |
| 2015/0045033 | A1 | 2/2015 | Kim et al. | |
| 2015/0230224 | A1 | 8/2015 | Maaref et al. | |
| 2018/0152234 | A1* | 5/2018 | Huang | H04B 7/15557 |
| 2021/0185590 | A1* | 6/2021 | Chandramouli | H04W 48/02 |
| 2021/0399770 | A1* | 12/2021 | Xu | H04W 8/24 |
| 2022/0224445 | A1* | 7/2022 | Xu | H04L 1/1671 |
| 2022/0394433 | A1* | 12/2022 | Xu | H04W 52/0216 |
| 2023/0034683 | A1* | 2/2023 | Zhang | H04L 1/1896 |
| 2023/0040978 | A1* | 2/2023 | Huang | H04L 5/0051 |
| 2023/0156680 | A1* | 5/2023 | Huang | H04L 5/0044 |
| | | | | 370/329 |
| 2023/0164697 | A1* | 5/2023 | Kong | H04W 4/48 |
| | | | | 370/318 |
| 2023/0246690 | A1* | 8/2023 | Khoshnevisan | H04B 7/0628 |
| | | | | 375/267 |
| 2023/0246756 | A1* | 8/2023 | Khoshnevisan | H04B 7/26 |
| | | | | 370/329 |
| 2023/0246760 | A1* | 8/2023 | Khoshnevisan | H04L 1/1812 |
| | | | | 370/329 |

OTHER PUBLICATIONS

International Search Report and Written Opinion—PCT/US2022/034991—ISA/EPO—dated Oct. 19, 2022.

* cited by examiner

COOPERATIVE USER EQUIPMENT SWITCHING

FIELD OF TECHNOLOGY

The following relates to wireless communications, including cooperative user equipment switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support cooperative user equipment switching.

A method for wireless communication at a second cooperative user equipment (UE) is described. The method may include receiving, from a target UE that forms a virtual UE with a first cooperative UE, an indication that the second cooperative UE has been selected to replace the first cooperative UE within the virtual UE, the first cooperative UE being served by a base station, selecting, during a beam management procedure and based on the second cooperative UE being selected, a beam for communicating with the base station, and relaying, based on selecting the beam, data received from the base station to the target UE.

An apparatus for wireless communication at a second cooperative UE is described. The apparatus may include a processor, memory coupled with the processor, and instructions stored in the memory. The instructions may be executable by the processor to cause the apparatus to receive, from a target UE that forms a virtual UE with a first cooperative UE, an indication that the second cooperative UE has been selected to replace the first cooperative UE within the virtual UE, the first cooperative UE being served by a base station, select, during a beam management procedure and based on the second cooperative UE being selected, a beam for communicating with the base station, and relaying, base at least in part on selecting the beam, data received from the base station to the target UE.

Another apparatus for wireless communication at a second cooperative UE is described. The apparatus may include means for receiving, from a target UE that forms a virtual UE with a first cooperative UE, an indication that the second cooperative UE has been selected to replace the first cooperative UE within the virtual UE, the first cooperative UE being served by a base station, means for selecting, during a beam management procedure and based on the second cooperative UE being selected, a beam for communicating with the base station, and means for relaying, based on selecting the beam, data received from the base station to the target UE.

A non-transitory computer-readable medium storing code for wireless communication at a second cooperative UE is described. The code may include instructions executable by a processor to receive, from a target UE that forms a virtual UE with a first cooperative UE, an indication that the second cooperative UE has been selected to replace the first cooperative UE within the virtual UE, the first cooperative UE being served by a base station, select, during a beam management procedure and based on the second cooperative UE being selected, a beam for communicating with the base station, and relaying, base at least in part on selecting the beam, data received from the base station to the target UE.

Some examples of the method, apparatuses, and non-transitory computer-readable medium described herein may further include operations, features, means, or instructions for transmitting, to the base station and based on receiving the indication, a signal that causes the beam management procedure to be initiated at the base station.

Some examples of the method, apparatuses, and non-transitory computer-readable medium described herein may further include operations, features, means, or instructions for communicating, to the target UE, signaling associated with channel conditions for the second cooperative UE, where the indication that the second cooperative UE may have been selected to replace the first cooperative UE received based on the channel conditions for the second cooperative UE.

In some examples of the method, apparatuses, and non-transitory computer-readable medium described herein, the signaling associated with the channel conditions for the second cooperative UE includes at least one of messaging associated with a quality of signals received at the second cooperative UE from the base station, or reference signals associated with a channel between the second cooperative UE and the target UE.

In some examples of the method, apparatuses, and non-transitory computer-readable medium described herein, selecting the beam may include operations, features, means, or instructions for selecting, during the beam management procedure, a second beam index that may be different than a first beam index associated with communications between the first cooperative UE and the base station.

In some examples of the method, apparatuses, and non-transitory computer-readable medium described herein, selecting the beam may include operations, features, means, or instructions for selecting, during the beam management procedure, a beam index that may be the same as a beam index associated with communications between the first cooperative UE and the base station.

In some examples of the method, apparatuses, and non-transitory computer-readable medium described herein, the beam management procedure includes a beam failure recovery procedure.

Some examples of the method, apparatuses, and non-transitory computer-readable medium described herein may further include operations, features, means, or instructions for broadcasting an identity of the second cooperative UE, where the indication that the second cooperative UE may have been selected may be received based on the broadcasting and operating as part of the virtual UE with the target UE based on being selected to replace the first cooperative UE.

In some examples of the method, apparatuses, and non-transitory computer-readable medium described herein, a second beam for communicating with the base station may be configured for the first cooperative UE and a third beam for communicating with the base station may be configured for the target UE when the beam may be selected for the second cooperative UE, and the second beam may be disabled based on the second beam being selected for the cooperative UE.

A method for wireless communication at a second cooperative UE is described. The method may include receiving, from a target UE that forms a virtual UE with a first cooperative UE, an indication that the second cooperative UE has been selected to replace the first cooperative UE within the virtual UE, the first cooperative UE served by a first base station, transmitting, to a second base station in a random access channel and based on receiving the indication, a message associated with establishing a connection between the second base station and the second cooperative UE, establishing the connection with the second base station based on transmitting the message, and relaying, based on establishing the connection with the second base station, data received from the second base station to the target UE.

An apparatus for wireless communication at a second cooperative UE is described. The apparatus may include a processor, memory coupled with the processor, and instructions stored in the memory. The instructions may be executable by the processor to cause the apparatus to receive, from a target UE that forms a virtual UE with a first cooperative UE, an indication that the second cooperative UE has been selected to replace the first cooperative UE within the virtual UE, the first cooperative UE served by a first base station, transmit, to a second base station in a random access channel and based on receiving the indication, a message associated with establishing a connection between the second base station and the second cooperative UE, establish the connection with the second base station based on transmitting the message, and relaying, base at least in part on establishing the connection with the second base station, data received from the second base station to the target UE.

Another apparatus for wireless communication at a second cooperative UE is described. The apparatus may include means for receiving, from a target UE that forms a virtual UE with a first cooperative UE, an indication that the second cooperative UE has been selected to replace the first cooperative UE within the virtual UE, the first cooperative UE served by a first base station, means for transmitting, to a second base station in a random access channel and based on receiving the indication, a message associated with establishing a connection between the second base station and the second cooperative UE, means for establishing the connection with the second base station based on transmitting the message, and means for relaying, based on establishing the connection with the second base station, data received from the second base station to the target UE.

A non-transitory computer-readable medium storing code for wireless communication at a second cooperative UE is described. The code may include instructions executable by a processor to receive, from a target UE that forms a virtual UE with a first cooperative UE, an indication that the second cooperative UE has been selected to replace the first cooperative UE within the virtual UE, the first cooperative UE served by a first base station, transmit, to a second base station in a random access channel and based on receiving the indication, a message associated with establishing a connection between the second base station and the second cooperative UE, establish the connection with the second base station based on transmitting the message, and relaying, base at least in part on establishing the connection with the second base station, data received from the second base station to the target UE.

Some examples of the method, apparatuses, and non-transitory computer-readable medium described herein may further include operations, features, means, or instructions for communicating, to the target UE, signaling associated with channel conditions for the second cooperative UE, where the indication that the second cooperative UE may have been selected to replace the first cooperative UE may be received based on the channel conditions for the second cooperative UE.

In some examples of the method, apparatuses, and non-transitory computer-readable medium described herein, the signaling associated with communicating with the second base station includes at least one of messaging associated with a quality of signals received at the second cooperative UE from the second base station, or reference signals associated with a channel between the second cooperative UE and the target UE.

A method for wireless communication at a first cooperative UE is described. The method may include receiving, from a target UE that forms a virtual UE with the first cooperative UE, an indication that a second cooperative UE has been selected to replace the first cooperative UE within the virtual UE, the first cooperative UE being served by a first base station, receiving, from the target UE, a first measurement of a quality of signals associated with the first cooperative UE and the first base station, a second measurement of a quality of signals associated with the second cooperative UE and a second base station, or both, transmitting, to the first base station, a message including at least one of the first measurement or the second measurement, receiving, from the first base station, an indication that a handover procedure to the second base station has been initiated for the target UE based on the message, and transmitting, to the target UE, the indication of the handover procedure.

An apparatus for wireless communication at a first cooperative UE is described. The apparatus may include a processor, memory coupled with the processor, and instructions stored in the memory. The instructions may be executable by the processor to cause the apparatus to receive, from a target UE that forms a virtual UE with the first cooperative UE, an indication that a second cooperative UE has been selected to replace the first cooperative UE within the virtual UE, the first cooperative UE being served by a first base station, receive, from the target UE, a first measurement of a quality of signals associated with the first cooperative UE and the first base station, a second measurement of a quality of signals associated with the second cooperative UE and a second base station, or both, transmit, to the first base station, a message including at least one of the first measurement or the second measurement, receive, from the first base station, an indication that a handover procedure to the second base station has been initiated for the target UE based on the message, and transmit, to the target UE, the indication of the handover procedure.

Another apparatus for wireless communication at a first cooperative UE is described. The apparatus may include means for receiving, from a target UE that forms a virtual UE with the first cooperative UE, an indication that a second cooperative UE has been selected to replace the first cooperative UE within the virtual UE, the first cooperative UE being served by a first base station, means for receiving, from the target UE, a first measurement of a quality of signals associated with the first cooperative UE and the first base station, a second measurement of a quality of signals associated with the second cooperative UE and a second base station, or both, means for transmitting, to the first base station, a message including at least one of the first measurement or the second measurement, means for receiving, from the first base station, an indication that a handover procedure to the second base station has been initiated for the target UE based on the message, and means for transmitting, to the target UE, the indication of the handover procedure.

A non-transitory computer-readable medium storing code for wireless communication at a first cooperative UE is described. The code may include instructions executable by a processor to receive, from a target UE that forms a virtual UE with the first cooperative UE, an indication that a second cooperative UE has been selected to replace the first cooperative UE within the virtual UE, the first cooperative UE being served by a first base station, receive, from the target UE, a first measurement of a quality of signals associated with the first cooperative UE and the first base station, a second measurement of a quality of signals associated with the second cooperative UE and a second base station, or both, transmit, to the first base station, a message including at least one of the first measurement or the second measurement, receive, from the first base station, an indication that a handover procedure to the second base station has been initiated for the target UE based on the message, and transmit, to the target UE, the indication of the handover procedure.

Some examples of the method, apparatuses, and non-transitory computer-readable medium described herein may further include operations, features, means, or instructions for relaying data received from the first base station to the target UE before receiving the indication that the second cooperative UE may have been selected to replace the first cooperative UE.

In some examples of the method, apparatuses, and non-transitory computer-readable medium described herein, the message initiates a mobility management procedure or a beam management procedure based on receiving the indication that the second cooperative UE may have been selected to replace the first cooperative UE.

Some examples of the method, apparatuses, and non-transitory computer-readable medium described herein may further include operations, features, means, or instructions for receiving, based on the handover procedure being initiated, an indication that a second connection between the second cooperative UE and the second base station may have been established and disabling a first connection between the first cooperative UE and the first base station based on the indication that the second connection may have been established.

A method for wireless communication at a target UE is described. The method may include operating as part of a virtual UE with a first cooperative UE, detecting, while operating as part of the virtual UE with the first cooperative UE, a quality of first signals associated with the first cooperative UE and a quality of second signals associated with a second cooperative UE, selecting, based on the detecting, the second cooperative UE to replace the first cooperative UE within the virtual UE, and receiving, via the second cooperative UE, data based on selecting the second cooperative UE to replace the first cooperative UE.

An apparatus for wireless communication at a target UE is described. The apparatus may include a processor, memory coupled with the processor, and instructions stored in the memory. The instructions may be executable by the processor to cause the apparatus to operate as part of a virtual UE with a first cooperative UE, detecting, while operate as part of the virtual UE with the first cooperative UE, a quality of first signals associated with the first cooperative UE and a quality of second signals associated with a second cooperative UE, select, based on the detecting, the second cooperative UE to replace the first cooperative UE within the virtual UE, and receive, via the second cooperative UE, data based on selecting the second cooperative UE to replace the first cooperative UE.

Another apparatus for wireless communication at a target UE is described. The apparatus may include means for operating as part of a virtual UE with a first cooperative UE, means for detecting, while operating as part of the virtual UE with the first cooperative UE, a quality of first signals associated with the first cooperative UE and a quality of second signals associated with a second cooperative UE, means for selecting, based on the detecting, the second cooperative UE to replace the first cooperative UE within the virtual UE, and means for receiving, via the second cooperative UE, data based on selecting the second cooperative UE to replace the first cooperative UE.

A non-transitory computer-readable medium storing code for wireless communication at a target UE is described. The code may include instructions executable by a processor to operate as part of a virtual UE with a first cooperative UE, detecting, while operate as part of the virtual UE with the first cooperative UE, a quality of first signals associated with the first cooperative UE and a quality of second signals associated with a second cooperative UE, select, based on the detecting, the second cooperative UE to replace the first cooperative UE within the virtual UE, and receive, via the second cooperative UE, data based on selecting the second cooperative UE to replace the first cooperative UE.

Some examples of the method, apparatuses, and non-transitory computer-readable medium described herein may further include operations, features, means, or instructions for establishing a connection with a base station and receiving, from the base station and while operating as part of the virtual UE with the first cooperative UE, second data via the connection and the first cooperative UE.

Some examples of the method, apparatuses, and non-transitory computer-readable medium described herein may further include operations, features, means, or instructions for operating as part of the virtual UE with the second cooperative UE based on selecting the second cooperative UE to replace the first cooperative UE and receiving, from the base station and while operating as part of the virtual UE with the second cooperative UE, third data via the connection and the second cooperative UE.

In some examples of the method, apparatuses, and non-transitory computer-readable medium described herein, operating as part of the virtual UE with the second cooperative UE may include operations, features, means, or instructions for establishing a second connection with the second cooperative UE based on selecting the second cooperative UE to replace the first cooperative UE and disabling a first connection with the first cooperative UE based on establishing the second connection with the second cooperative UE.

Some examples of the method, apparatuses, and non-transitory computer-readable medium described herein may further include operations, features, means, or instructions for transmitting, to the first cooperative UE and based on selecting the second cooperative UE to replace the first cooperative UE, a message directing the first cooperative UE to initiate a beam management procedure for a base station serving the first cooperative UE.

Some examples of the method, apparatuses, and non-transitory computer-readable medium described herein may further include operations, features, means, or instructions for establishing a second connection with the second cooperative UE based on an indication that the second cooperative UE may have selected a beam index during the beam management procedure and disabling a first connection with the first cooperative UE after establishing the second connection with the second cooperative UE, where the second cooperative UE replaces the first cooperative UE within the virtual UE based on establishing the second connection and disabling the first connection.

Some examples of the method, apparatuses, and non-transitory computer-readable medium described herein may further include operations, features, means, or instructions for transmitting, to a base station that may have a connection with the first cooperative UE and based on selecting the second cooperative UE to replace the first cooperative UE, a message to initiate a beam management procedure for the second cooperative UE.

In some examples of the method, apparatuses, and non-transitory computer-readable medium described herein, and the method, apparatuses, and non-transitory computer-readable medium may include further operations, features, means, or instructions for receiving a first message including an indication of a quality of first signaling between the first cooperative UE and a base station that may have a connection with the first cooperative UE and performing measurements on first signaling between the first cooperative UE and the target UE.

In some examples of the method, apparatuses, and non-transitory computer-readable medium described herein, and the method, apparatuses, and non-transitory computer-readable medium may include further operations, features, means, or instructions for receiving a second message including an indication of a quality of second signaling between the second cooperative UE and the base station and performing measurements on second signaling between the second cooperative UE and the target UE.

In some examples of the method, apparatuses, and non-transitory computer-readable medium described herein, the first cooperative UE may have a first connection with a first base station, the first signals include at least one of first signaling between the first cooperative UE and the first base station or second signaling between the first cooperative UE and the target UE, and the second signals include at least one of first signaling between the second cooperative UE and a second base station or second signaling between the second cooperative UE and the target UE.

In some examples of the method, apparatuses, and non-transitory computer-readable medium described herein, and the method, apparatuses, and non-transitory computer-readable medium may include further operations, features, means, or instructions for receiving at least one of a first message including an indication of a quality of signals associated with the first cooperative UE and the first base station or a second message including an indication of a quality of signals associated with the second cooperative UE and the second base station and performing measurements on at least one of first signaling received from the first cooperative UE or second signaling received from the second cooperative UE.

Some examples of the method, apparatuses, and non-transitory computer-readable medium described herein may further include operations, features, means, or instructions for transmitting, to the second cooperative UE, a message directing the second cooperative UE to initiate a random access procedure with the second base station based on selecting the second cooperative UE to replace the first cooperative UE.

Some examples of the method, apparatuses, and non-transitory computer-readable medium described herein may further include operations, features, means, or instructions for transmitting, to the first base station via the first cooperative UE and based on selecting the second cooperative UE to replace the first cooperative UE, a message indicating the quality of the first signaling between the first cooperative UE and the first base station and the quality of the first signaling between the second cooperative UE and the second base station.

Some examples of the method, apparatuses, and non-transitory computer-readable medium described herein may further include operations, features, means, or instructions for receiving, from the first base station via the first cooperative UE and in response to the message, a second message indicating that a handover procedure for the virtual UE from the first base station to the second base station may have been initiated, transmitting, to the second cooperative UE and based on the second message, a third message directing the second cooperative UE to perform a random access procedure with the second base station, and receiving, from the second base station via the second cooperative UE, a fourth message indicating a completion of the handover procedure, where the data originates from the second base station and may be received from the second cooperative UE based on the completion of the handover procedure.

DETAILED DESCRIPTION

Figure 1:
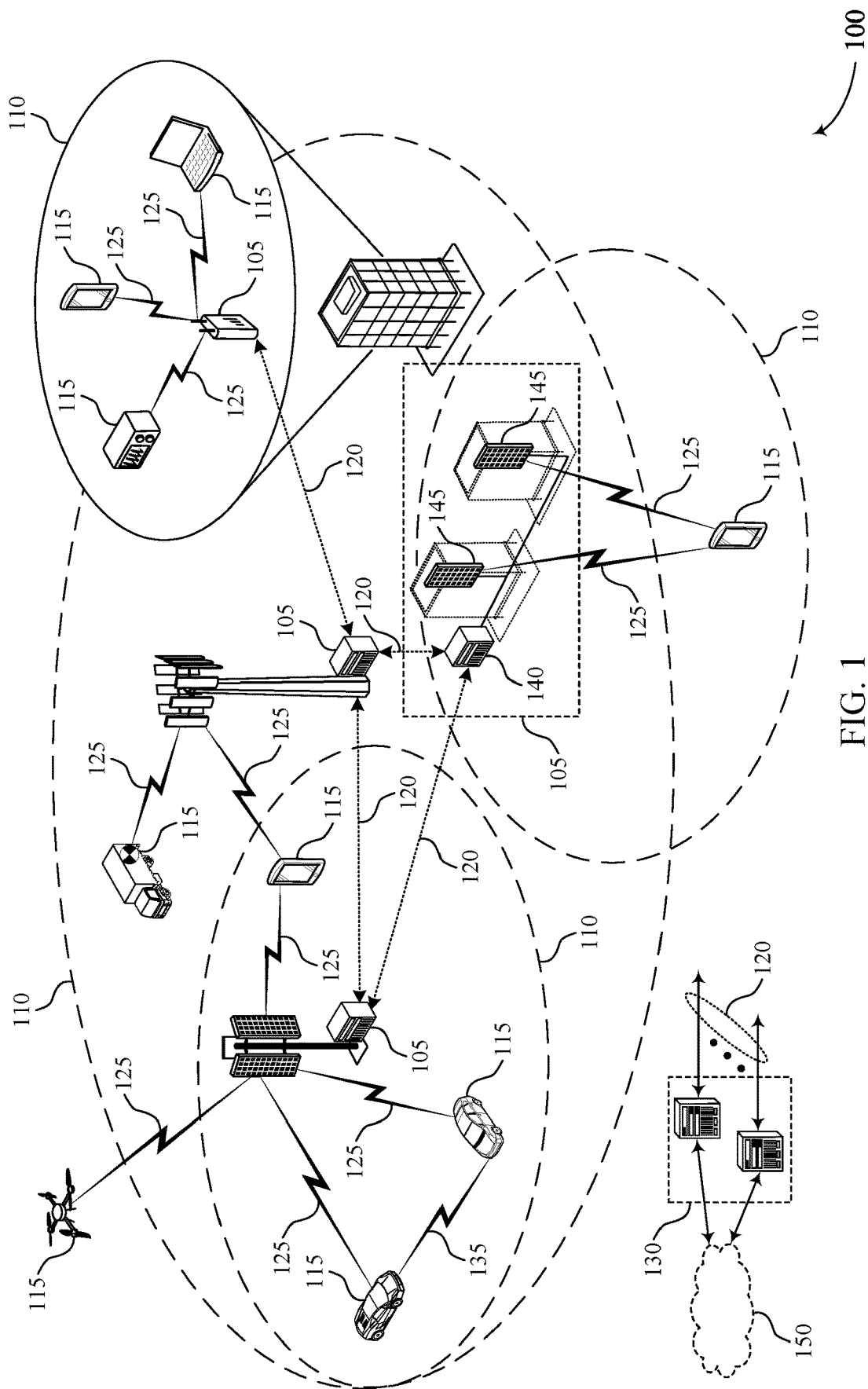
FIG. 1 illustrates an example of a wireless communications system that supports cooperative user equipment switching in accordance with aspects of the present disclosure.

A device for communications (which may be referred to as a "target device" or "destination device") may cooperate with another device for communications (which may be referred to as a "cooperative device") to exchange data with a radio access network. In some examples, from the perspective of the radio access network, the target device and the cooperative device may collectively appear to the radio access network as a single device, which may be referred to as a virtual device. Thus, for example, a virtual device may be formed by aggregating a target device and a cooperative device. In some examples, the virtual device may adopt characteristics of the target device (e.g., identifiers, capabilities, etc.), and the radio access network may unknowingly communicate with the cooperative device—in some examples, the cooperative device may not have a subscription for accessing the radio access network. For example, in some cases, the cooperative device may appear to the radio access network or otherwise interact with the radio access network as one or more additional antenna panels of the target device, beyond the quantity of one or more antenna panels that may be physically included in the target device.

In some examples, after a first cooperative device is selected, a target device or other entity may identify a second cooperative device that is preferred to the first cooperative device for communicating with the radio access network—e.g., a device that has a better connection to (e.g., better channel conditions with respect to) the radio access network, a better connection to the target UE, or both. In such cases, the second cooperative device may replace the first cooperative device within the virtual UE (e.g., the second cooperative device may begin operating as a cooperative device with respect to the target device, and the first cooperative device may cease such operation).

To support a seamless handover of communications from a first cooperative device to a second cooperative device, techniques as described herein may be used to hand over communications between cooperative devices. In the absence of such techniques, during a handover between cooperative devices, communications associated with the first cooperative device may fail to be delivered to the target device. In some such cases, the data in the failed communications may be retransmitted to the target device, which may reduce a throughput of the radio network or degrade a user experience. Additionally, or alternatively, the data in the failed communications may be lost, further degrading a user experience.

In some examples described herein, before a new cooperative device is selected, a target device has a direct connection with a base station and an indirect connection with the base station through a cooperative device. After the new cooperative device is selected by the target device or some other entity, a beam management procedure may be triggered at a base station used to serve the original cooperative device—e.g., by indicating a beam failure to the base station. The cooperative device selected for handover (instead of the original cooperative device) may participate in the beam management procedure and select a beam index for communicating with the base station—which may be associated with the same beam used by the original cooperative device or a different beam. Thus, the base station may resume communications with the selected cooperative device after the beam management procedure is completed.

By using a beam management procedure to hand over communications between cooperative devices, the handover procedure may be performed in at least some cases without informing the base station of the handover and without performing additional procedures (e.g., random-access procedures) for establishing a connection between the base station and the selected cooperative device. Thus, handing over communications using a beam management procedure may be performed using less signaling, resources, or both, which may increase a throughput of communications for the target device.

In some additional examples, before a new cooperative device is selected, a target device has a direct connection with a base station and an indirect connection with the base station through a cooperative device. After the new cooperative device is selected by the target device or some other entity, the selected cooperative device may be triggered to perform a random-access procedure to establish a connection with the base station or a different base station. In some examples, the selected cooperative device establishes a connection with a different base station than the base station that has a connection with the original cooperative device and the target device. In some examples, after the second cooperative device establishes the connection with the base station, the connection between the original cooperative device and the radio network may be disabled. Thus, the radio network may communicate with the target device using a first base station and the selected cooperative device using a second base station after the selected cooperative device establishes a connection to the radio network.

By using a random-access procedure to hand over communications between cooperative devices, the selected cooperative device may establish a connection with a different base station associated with a preferred channel for the selected cooperative device (relative to the channel between the selected cooperative device and a base station used to serve the original cooperative device), which may increase a throughput and reliability of communications for the target device.

And in some examples, before a new cooperative device is selected, a target device has an indirect connection with a base station through a cooperative device. After the new cooperative device is selected by the target device or some other entity, a mobility management procedure may be triggered at a base station used to serve the original cooperative device—e.g., by indicating measurements to the base station that trigger mobility management. The cooperative device selected for handover (instead of the original cooperative device) may participate in the mobility management procedure. In some examples, after triggering the mobility management procedure at the base station, the cooperative device may be triggered to perform a random-access procedure to establish a connection with a base station. In some examples, the selected cooperative device establishes a connection with a different base station than the base station that has a connection with the original cooperative device. In some examples, after the second cooperative device establishes the connection with the base station, the connection between the original cooperative device and the radio network may be disabled. Thus, the radio network may communicate with the target device via the selected cooperative device after the selected cooperative device establishes a connection to the radio network.

By using a mobility management procedure to hand over communications between cooperative devices, the radio access network may have control over the handover procedure, which may increase a throughput and reliability of communications for the target device—e.g., by allowing the radio access network to pick a preferred base station to use for the selected cooperative device.

Aspects of the disclosure are initially described in the context of wireless communications systems. Aspects of the disclosure are also described in the context of process flows. Aspects of the disclosure are further illustrated by and described with reference to apparatus diagrams, system diagrams, and flowcharts that relate to cooperative user equipment switching.

FIG. 1 illustrates an example of a wireless communications system that supports cooperative user equipment switching in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

A UE 115 may use (e.g., cooperate with) nearby UEs 115 to enhance the communicative capabilities of the UE 115—e.g., using cooperative communication techniques. In some examples, a UE 115 borrows hardware (e.g., antennas, RF circuitry, etc.) at another UE 115 (e.g., a UE 115 owned by a friend of family member of the owner of the UE 115) to communicate with the radio network. The UE 115 may be referred to as a target UE 115 or a destination UE 115—e.g., because the UE 115 may be the final destination of data transmitted from the radio network. Also, the other UE 115 may be referred to as a cooperative UE 115. In some examples, the target UE 115 may have a subscription for accessing the radio network, and the cooperative UE 115 may not have a subscription for accessing the radio network. In some examples, the target UE 115 establishes a first connection to the radio network itself and a second connection to the radio network via the cooperative UE 115. In other examples, the target UE 115 establishes a single connection to the radio network via the cooperative UE 115.

From a perspective of a base station 105, communications with the target UE 115 and the cooperative UE 115 may appear as communications solely with the target UE 115—that is, the base station 105 may not know that it is communicating with the cooperative UE 115. Accordingly, the target UE 115 and cooperative UE 115 may be referred to as a virtual UE 115 (e.g., a UE 115 that is formed by aggregating the target UE and cooperative UE or components thereof)—e.g., the target UE 115 and cooperative UE 115 may be operated as a single UE with an antenna array that includes physically separated antenna elements. In some examples, the virtual UE 115 may use information associated with the target UE 115 (e.g., identifiers of the target UE 115). The cooperative UE 115 may relay, to the target UE 115, data received from the base station 105—e.g., using a direct communication technique, such as sidelink, Bluetooth, Wi-Fi, etc.

A target UE 115 may select a cooperative UE 115 from a set of available UEs 115. In some examples, the target UE 115 selects the cooperative UE 115 that will provide the best connection to the radio network. In some examples, the target UE 115 determines which of the set of available UEs 115 to select based on a quality of a channel between the UEs 115 and the radio access network, a quality of a channel between the UEs 115 and the target UE 115, or both. In some cases, the target UE 115 selects a cooperative UE 115 that detects the highest quality for signals (e.g., reference signals) transmitted from the radio network relative to the other UEs 115. In some cases, the target UE 115 selects a cooperative UE 115 based on signals (e.g., reference signals) transmitted from the cooperative UE 115 having a highest quality relative to the other UEs 115.

In some examples, after a first cooperative UE 115 is selected, a target UE 115 may identify a second cooperative UE 115 that is preferred to the first cooperative UE 115 for communicating with the radio access network—e.g., a UE that has a better connection to the radio access network. In such cases, the target UE 115 may choose to use the second cooperative UE 115 instead of the first cooperative UE 115.

To support a seamless handover of communications from a first cooperative device to a second cooperative device, techniques as described herein may be used to hand over communications between cooperative devices. In the absence of such techniques, during a handover between cooperative devices, communications associated with the first cooperative device may fail to be delivered to the target device. In some such cases, the data in the failed communications may be retransmitted to the target device, which may reduce a throughput of the radio network or degrade a user experience. Additionally, or alternatively, the data in the failed communications may be lost, further degrading a user experience.

In some examples, a target UE has a direct connection with a base station and an indirect connection with the base station through a cooperative UE before selecting a new cooperative UE. After a new cooperative UE is selected by the target UE, a beam management procedure may be triggered at a base station used to serve the original cooperative UE—e.g., by indicating a beam failure to the base station. The cooperative UE selected for handover (instead of the original cooperative UE) may participate in the beam management procedure and select a beam index for communicating with the base station—which may be associated with the same beam used by the original cooperative UE or a different beam. Thus, the base station may resume communications with the selected cooperative UE after the beam management procedure is completed.

In some examples, a target UE has a direct connection with a base station and an indirect connection with the base station through a cooperative UE before selecting a new cooperative UE. After a new cooperative UE is selected by the target UE, the selected cooperative UE may be triggered to perform a random-access procedure to establish a connection with the base station or a different base station. In some examples, the selected cooperative UE establishes a connection with a different base station than the base station that has a connection with the original cooperative UE and the target UE. In some examples, after the second cooperative UE establishes the connection with the base station, the connection between the original cooperative UE and the radio network may be disabled. Thus, the radio network may communicate with the target UE using a first base station and the selected cooperative UE using a second base station after the selected cooperative UE establishes a connection to the radio network.

In some examples, a target UE has an indirect connection with a base station through a cooperative UE before selecting a new cooperative UE. After a new cooperative UE is selected by the target UE, a mobility management procedure may be triggered at a base station used to serve the original cooperative UE—e.g., by indicating measurements to the base station that trigger mobility management. The cooperative UE selected for handover (instead of the original cooperative UE) may participate in the mobility management procedure. In some examples, after triggering the mobility management procedure at the base station, the cooperative UE may be triggered to perform a random-access procedure to establish a connection with a base station. In some examples, the selected cooperative UE establishes a connection with a different base station than the base station that has a connection with the original cooperative UE. In some examples, after the second cooperative UE establishes the connection with the base station, the connection between the original cooperative UE and the radio network may be disabled. Thus, the radio network may communicate with the target UE via the selected cooperative UE after the selected cooperative UE establishes a connection to the radio network.

Figure 2A:
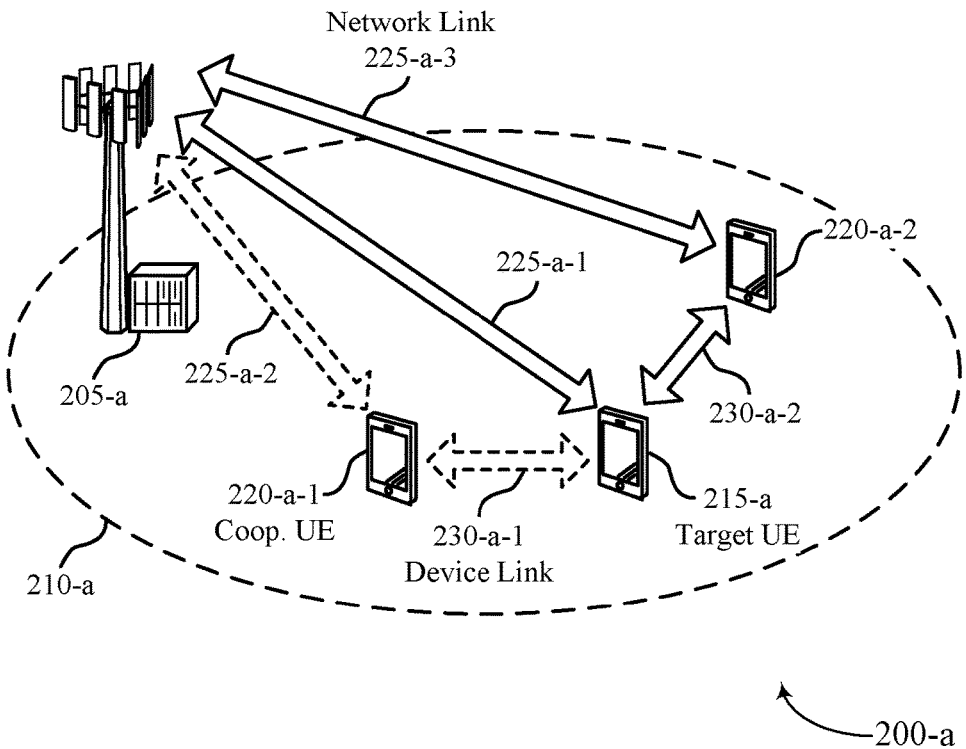
FIGS. 2A and 2B illustrate examples of wireless communication subsystems that support cooperative user equipment switching in accordance with aspects of the present disclosure.

FIG. 2A illustrates an example of a wireless communications subsystem that supports cooperative user equipment switching in accordance with aspects of the present disclosure.

Wireless communications subsystem 200-a includes base station 205-a which may be an example of a base station described with reference to FIG. 1. Wireless communications subsystem 200-a may also include target UE 215-a, first cooperative UE 220-a-1, and second cooperative UE 220-a-2, which may be examples of a UE described with reference to FIG. 1. Base station 205-a, target UE 215-a, first cooperative UE 220-a-1, and second cooperative UE 220-a-2 may communicate with one another within coverage area 210-a using one or more of the techniques described above with reference to FIG. 1.

In some examples, first network link 225-a-1 is established between base station 205-a and target UE 215-a. First network link 225-a-1 may be a direct link between target UE 215-a and the radio network, and base station 205-a and target UE 215-a may exchange data over first network link 225-a-1.

In some examples, target UE 215-a selects first cooperative UE 220-a-1 for cooperative communications with base station 205-a. In some examples, target UE 215-a selects first cooperative UE 220-a-1 based on a signal quality associated with communicating with the radio network via first cooperative UE 220-a-1 exceeding a threshold. In such cases, an indirect link between target UE 215-a and base station 205-a may be established via first cooperative UE 220-a-1. The indirect link may include second network link 225-a-2 and first device link 230-a-1. First cooperative UE 220-a-1 may relay, to target UE 215-a, communications received from base station 205-a via first device link 230-a-1. Also, first cooperative UE 220-a-1 may relay, to base station 205-a, communications received from target UE 215-a via second network link 225-a-2. In some examples, it may appear to base station 205-a as if base station 205-a is directly communicating with target UE over two direct communication links—that is, base station 205-a may be unaware that first cooperative UE 220-a-1 is relaying communications between base station 205-a and target UE 215-a.

In some examples, target UE 215-a determines that communicating with base station 205-a via second cooperative UE 220-a-2 is preferable to communicating with base station 205-a via first cooperative UE 220-a-1. For example, if a quality of a channel between second cooperative UE 220-a-2 and base station 205-a is better than a quality of a channel between first cooperative UE 220-a-1 and base station 205-a. If a quality of a channel between second cooperative UE 220-a-2 and target UE 215-a is better than a quality of a channel between first cooperative UE 220-a-1 and target UE 215-a. If first cooperative UE 220-a-1 revokes a permission enabling target UE 215-a to use first cooperative UE 220-a-1 for cooperative communications. Or any combination thereof.

After determining second cooperative UE 220-a-2 to be preferable, a procedure for handing over communications between base station 205-a and first cooperative UE 220-a-1 to second cooperative UE 220-a-2 may be performed. In some examples, the procedure for handing over the communication may include triggering a beam management procedure at base station 205-a and second cooperative UE 220-a-2, as further described herein, such as with reference to FIG. 3.

After the cooperative UE handover procedure is completed, an indirect link between target UE 215-a and base station 205-a may be established via second cooperative UE 220-a-2, and in some examples, the indirect link via first cooperative UE 220-a-1 may be disabled. The indirect link via second cooperative UE 220-a-2 may include third network link 225-a-3 between base station 205-a and second cooperative UE 220-a-2 and second device link 230-a-2 between target UE 215-a and second cooperative UE 220-a-2. Accordingly, base station 205-a and target UE 215-a may continue communicating over first network link 225-a-1 and resume communications over third network link 225-a-3 and second device link 230-a-2.

Figure 2B:
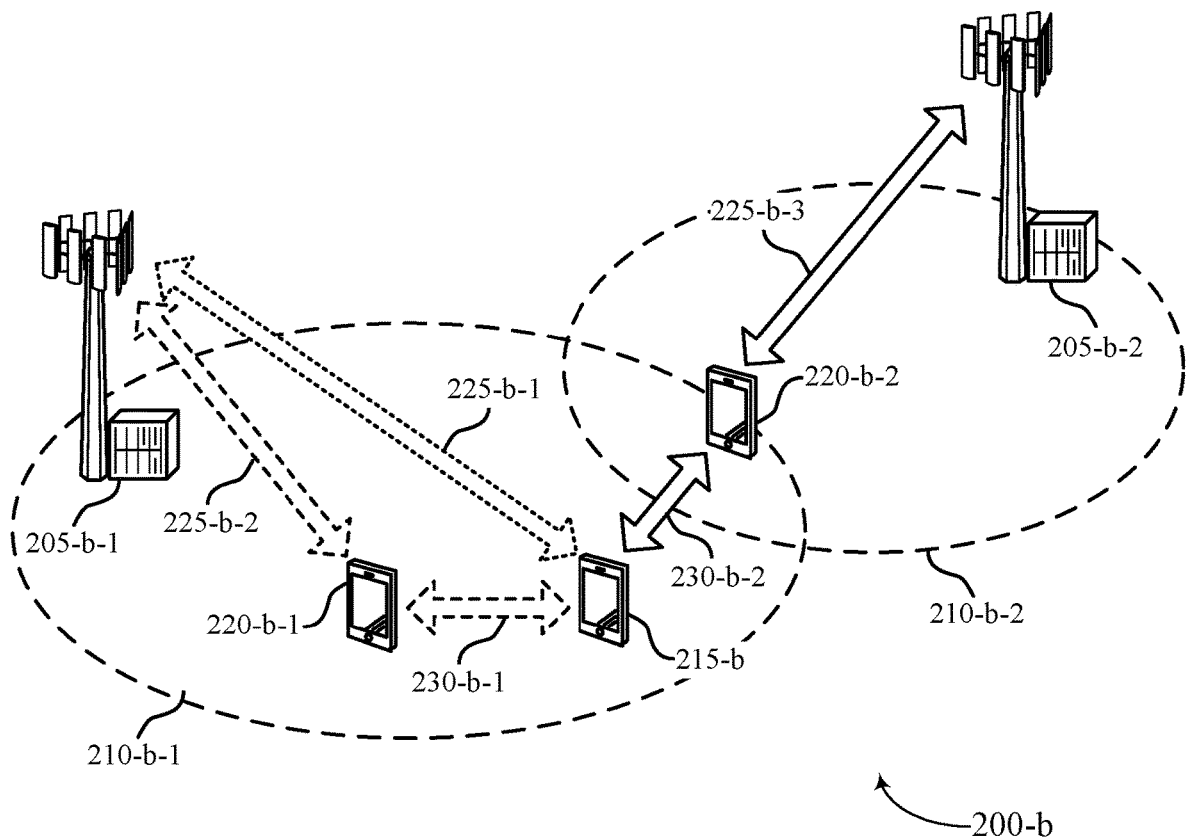

FIG. 2B illustrates an example of a wireless communications subsystem that supports cooperative user equipment switching in accordance with aspects of the present disclosure.

Wireless communications subsystem 200-b includes first base station 205-b-1 and second base station 205-b-2, which may be examples of a base station described with reference to FIGS. 1 and 2A. Wireless communications subsystem 200-b may also include target UE 215-b, first cooperative UE 220-b-1, and second cooperative UE 220-b-2, which may be examples of a UE described with reference to FIGS. 1 and 2A. First base station 205-b-1, second base station 205-b-2, target UE 215-b, first cooperative UE 220-b-1, and second cooperative UE 220-b-2 may communicate with one another within first coverage area 210-b-1 and second coverage area 210-b-2 using one or more of the techniques described above with reference to FIGS. 1 and 2A.

In some examples, target UE 215-b establishes a direct link to first base station 205-b-1 via first network link 225-b-1 and an indirect link to first base station 205-b-1 via first cooperative UE 220-b-1, as similarly described with reference to FIG. 2A. Also, as similarly described with reference to FIG. 2A, target UE 215-b may determine that communicating with second base station 205-b-2 via second cooperative UE 220-b-2 is preferable to communicating with first base station 205-b-1 via first cooperative UE 220-b-1.

After determining second cooperative UE 220-b-2 to be preferable, a procedure for handing over communications between first base station 205-b-1 and first cooperative UE 220-b-1 to second cooperative UE 220-b-2 may be performed. In some examples, the procedure for handing over the communication may include triggering a random-access procedure at second cooperative UE 220-b-2, as further described herein, such as with reference to FIG. 4.

In some examples, target UE 215-b establishes an indirect link to first base station 205-b-1 via first cooperative UE 220-b-1, as similarly described with reference to FIG. 2A, without establishing a direct link to first base station 205-

*b*-1. That is, target UE 215-*b* may solely have an indirect link to first base station 205-*b*-1 through a cooperative UE. Also, as similarly described with reference to FIG. 2A, target UE 215-*b* may determine that communicating with second base station 205-*b*-2 via second cooperative UE 220-*b*-2 is preferable to communicating with first base station 205-*b*-1 via first cooperative UE 220-*b*-1.

After determining second cooperative UE 220-*b*-2 to be preferable, a procedure for handing over communications between first base station 205-*b*-1 and first cooperative UE 220-*b*-1 to second cooperative UE 220-*b*-2 may be performed. In some examples, the procedure for handing over the communication may include triggering a mobility management procedure at the radio network and second cooperative UE 220-*b*-2, as further described herein, such as with reference to FIG. 5.

In both cases, after the cooperative UE handover procedure is completed, an indirect link between target UE 215-*b* and second base station 205-*b*-2 may be established via second cooperative UE 220-*b*-2, and in some examples, the indirect link via first cooperative UE 220-*b*-1 may be disabled. The indirect link via second cooperative UE 220-*b*-2 may include third network link 225-*b*-3 between second base station 205-*b*-2 and second cooperative UE 220-*b*-2 and second device link 230-*b*-2 between target UE 215-*b* and second cooperative UE 220-*b*-2. Accordingly, second base station 205-*b*-2 and target UE 215-*b* may resume communications over third network link 225-*b*-3 and second device link 230-*b*-2. And in examples where a direct link is established between target UE 215-*b* and first base station 205-*b*-1, target UE 215-*b* may continue communicating with first base station 205-*b*-1 over first network link 225-*b*-1.

Figure 3:
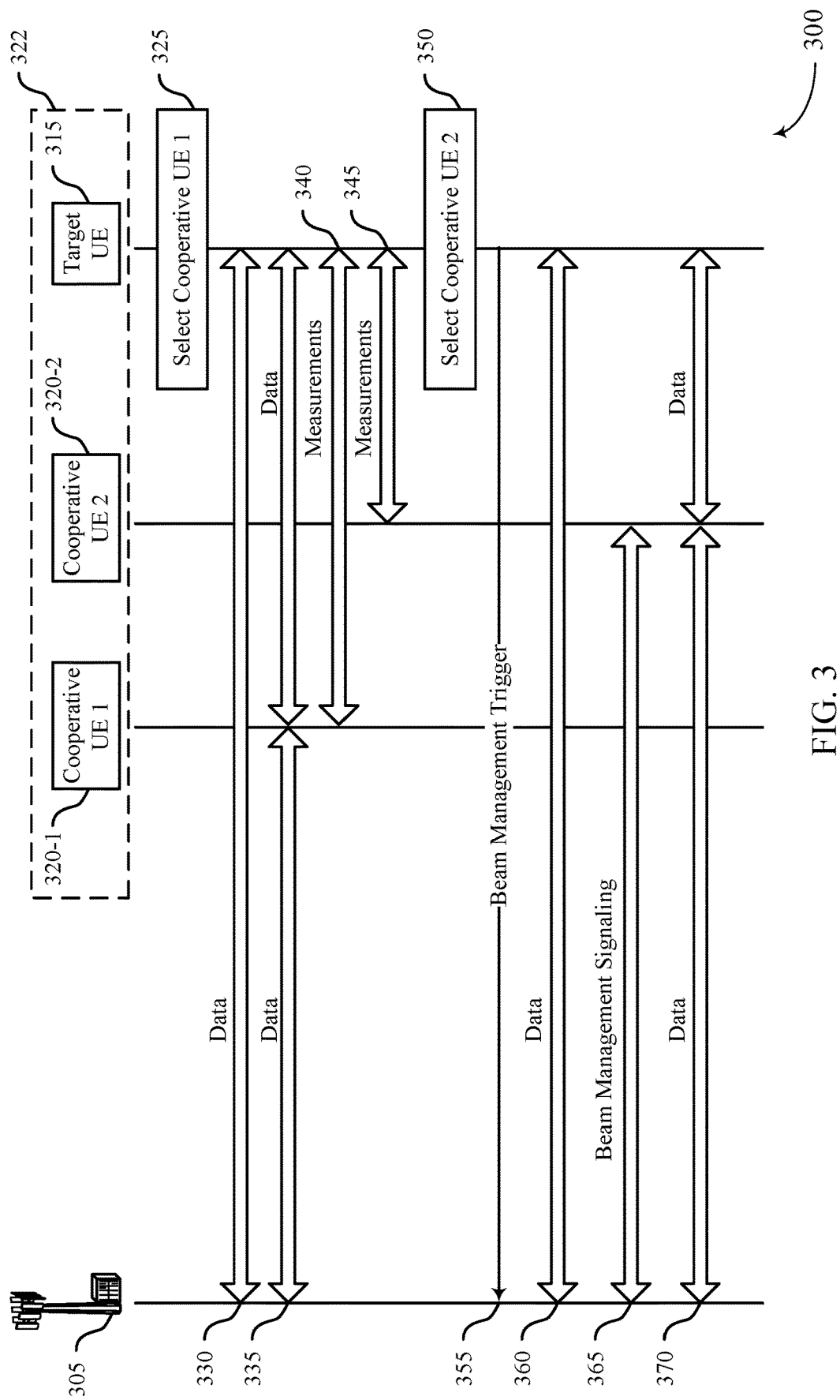
FIGS. 3 through 5 illustrate example sets of operations for cooperative user equipment switching in accordance with aspects of the present disclosure.

FIG. 3 illustrates an example of a set of operations for cooperative user equipment switching in accordance with aspects of the present disclosure.

Process flow 300 may be performed by base station 305, which may be an example of a base station described with reference to FIGS. 1 and 2, and target UE 315, first cooperative UE 320-1, and second cooperative UE 320-2, which may be examples of a UE described with reference to FIGS. 1 and 2. In some examples, process flow 300 illustrates an exemplary sequence of operations performed to support cooperative user equipment switching. For example, process flow 300 depicts operations for handing communications over from one cooperative UE to another cooperative UE by triggering beam management procedures.

It is understood that one or more of the operations described in process flow 300 may be performed earlier or later in the process, omitted, replaced, supplemented, or combined with another operation. Also, additional operations described herein that are not included in process flow 300 may be included.

At block 325, target UE 315 may select first cooperative UE 320-1 for forming virtual UE 322. In some examples, target UE 315 selects first cooperative UE 320-1 for forming virtual UE 322 based on signal characteristics associated with communicating with base station 305 being greater than a threshold or the best relative to other cooperative UEs in a vicinity of target UE 315. In some examples, second cooperative UE 320-2 is not available for forming virtual UE 322 when target UE 315 selects first cooperative UE 320-1. In some examples, signal characteristics associated with communicating with base station 305 via second cooperative UE 320-2 are less preferred relative to the signal characteristics associated with communicating with base station 305 via first cooperative UE 320-1.

At arrow 330 and arrow 335, base station 305 may exchange data with virtual UE 322 formed by first cooperative UE 320-1 and target UE 315. At arrow 330, base station 305 may exchange data directly with target UE 315 via a direct communication link. At arrow 330, base station 305 may exchange data indirectly with target UE 315 via an indirect communication link through first cooperative UE 320-1. The indirect communication link may use a device-to-device communications protocol, such as a sidelink communications protocol, Wi-Fi, Bluetooth, or the like.

As described herein, from the perspective of base station 305, base station 305 may determine that both links are direct links to target UE 315. In some examples, base station 305 may determine that the communications over the different links are communicated to target UE 315 using different component carriers, spatial layers, or both.

At arrow 340, target UE 315 may obtain measurements associated with communicating with base station 305 via first cooperative UE 320-1. In some examples, target UE 315 receives, from first cooperative UE 320-1, a first set of measurements taken by first cooperative UE 320-1 associated with a quality of a channel between first cooperative UE 320-1 and base station 305. In some examples, first cooperative UE 320-1 determines a quality of the channel based on reference signals (e.g., cell-specific reference signals) transmitted from base station 305—e.g., based on a signal-to-noise ratio determined for the reference signals. Target UE 315 may also determine a quality of a channel between target UE 315 and first cooperative UE 320-1—e.g., based on reference signals transmitted by first cooperative UE 320-1, reference signals transmitted by target UE 315, or both.

At arrow 345, target UE 315 may similarly obtain measurements associated with communicating with base station 305 via second cooperative UE 320-2.

At block 350, target UE 315 may select second cooperative UE 320-2 to replace first cooperative UE 320-1 within virtual UE 322. In some examples, target UE 315 selects second cooperative UE 320-2 based on determining that a channel associated with communicating with base station 305 via second cooperative UE 320-2 is preferred relative to a channel associated with communicating with base station 305 via first cooperative UE 320-1—e.g., if signal-to-noise characteristics associated with communicating with base station 305 via second cooperative UE 320-2 exceed signal-to-noise characteristics associated with communicating with base station 305 via first cooperative UE 320-1.

In some examples, target UE 315 may determine that the channel associated with communicating with base station 305 via second cooperative UE 320-2 is preferred based on determining a channel between base station 305 and second cooperative UE 320-2 is better than a channel between base station 305 and first cooperative UE 320-1. In some examples, target UE 315 may determine that the channel associated with communicating with base station 305 via second cooperative UE 320-2 is preferred based on determining a channel between target UE 315 and second cooperative UE 320-2 is better than a channel between target UE 315 and first cooperative UE 320-1. In some examples, target UE 315 may determine that the channel associated with communicating with base station 305 via second cooperative UE 320-2 is preferred based on determining that a composite channel including a channel between base station 305 and second cooperative UE 320-2 and a channel between target UE 315 and second cooperative UE 320-2 is better than a similar composite channel for first cooperative UE 320-1.

In some examples, target UE 315 may select second cooperative UE 320-2 regardless of the results of the measurement—e.g., if first cooperative UE 320-1 becomes unavailable to target UE 315. First cooperative UE 320-1 may become unavailable to target UE 315 if first cooperative UE 320-1 leaves a vicinity of target UE 315, a mode for cooperating with other UEs is disabled at first cooperative UE 320-1, among other examples.

At arrow 355, a beam management procedure may be triggered. In some examples, to trigger the beam management procedure, target UE 315, first cooperative UE 320-1, second cooperative UE 320-2, or a combination thereof, may send signaling to base station 305 that triggers the beam management procedure. In some examples, to trigger the beam management procedure, first cooperative UE 320-1 transmits a signal that indicates a failure (or forthcoming failure) of a beam used to communicate with first cooperative UE 320-1.

At arrow 360, base station 305 and target UE 315 may continue to exchange data via the direct link between base station 305 and target UE 315.

At arrow 365, base station 305 and second cooperative UE 320-2 may exchange signaling associated with a beam management procedure. In some examples, the beam management procedure is a procedure for recovering from a beam failure. In some examples, base station 305 transmits a set of signals using a set of beams. Second cooperative UE 320-2 may receive the set of signals using the set of beams and may determine a preferred beam of the set of beams. Second cooperative UE 320-2 may select the preferred beam and transmit an indication of the preferred beam—e.g., by signaling a beam index of the preferred beam. In some examples, the preferred beam is the same beam previously used for communications between first cooperative UE 320-1 and base station 305—e.g., if second cooperative UE 320-2 is positioned near first cooperative UE 320-1. In other examples, the preferred beam is different than the beam previously used for communications between first cooperative UE 320-1 and base station 305—e.g., if a blockage between second cooperative UE 320-2 and base station 305 would otherwise interfere with communications between second cooperative UE 320-2 and base station 305 using the beam previously used by first cooperative UE 320-1. In some examples, when second cooperative UE 320-2 selects the preferred beam, there are three beams configured for virtual UE 322—the current beam configured for first cooperative UE 320-1, the current beam configured for target UE 315, and the preferred beam selected for second cooperative UE 320-2.

At arrow 370, base station 305 may communicate with target UE 315 via second cooperative UE 320-2 using the preferred beam. In some examples, base station 305 may transmit a communication for target UE 315 using the preferred beam. Second cooperative UE 320-2 may receive the communication using preferred beam and may relay data received in the communication to target UE 315 via a link (e.g., a sidelink, Wi-Fi link, Bluetooth link, etc.) between second cooperative UE 320-2 and target UE 315. Similarly, target UE 315 may transmit data in a communication to second cooperative UE 320-2. And second cooperative UE 320-2 may relay the data to base station 305 in a transmission using the preferred beam. In some examples, after configuring the preferred beam for second cooperative UE 320-2, and, in some examples, after exchanging data with second cooperative UE 2, the beam configured for first cooperative UE 320-1 may be dropped. Establishing and maintaining beams for each of first cooperative UE 320-1, second cooperative UE 320-2, and target UE 315 before dropping the beam configured for first cooperative UE 320-1 may enable a seamless handover of a data stream from first cooperative UE 320-1 to to second cooperative UE 320-2.

Figure 4:
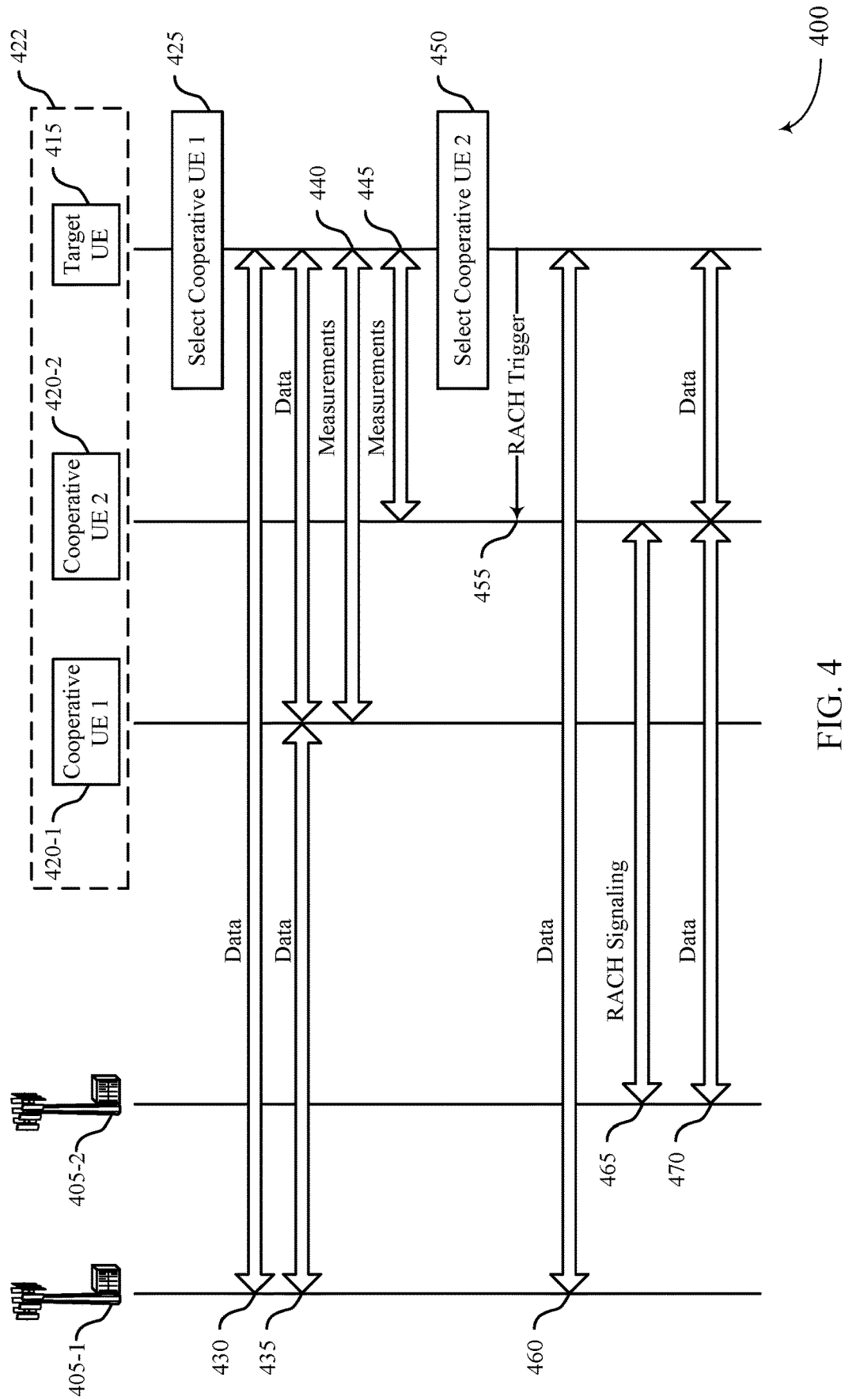

FIG. 4 illustrates an example of a set of operations for cooperative user equipment switching in accordance with aspects of the present disclosure.

Process flow 400 may be performed by first base station 405-1 and second base station 405-2, which may be examples of a base station described with reference to FIGS. 1 through 3, and target UE 415, first cooperative UE 420-1, and second cooperative UE 420-2, which may be examples of a UE described with reference to FIGS. 1 through 3. In some examples, process flow 400 illustrates an exemplary sequence of operations performed to support cooperative user equipment switching. For example, process flow 400 depicts operations for handing communications over from one cooperative UE to another cooperative UE by triggering the other cooperative UE to perform a RACH procedure.

It is understood that one or more of the operations described in process flow 400 may be performed earlier or later in the process, omitted, replaced, supplemented, or combined with another operation. Also, additional operations described herein that are not included in process flow 400 may be included.

At block 425, target UE 415 may select first cooperative UE 420-1 for forming virtual UE 422, as similarly described with reference to block 325 of FIG. 3. At arrow 430 and arrow 435, target UE 415 may exchange data with first base station 405-1, as similarly described with reference to arrow 330 and arrow 335 of FIG. 3.

At arrow 440 and arrow 445, target UE 415 may obtain measurements associated with communicating with the radio access network via first cooperative UE 420-1, second cooperative UE 420-2, first base station 405-1, second base station 405-2, or any combination thereof, as similarly described with reference to arrow 340 and arrow 345 of FIG. 3. In some examples, obtaining the measurements may also include determining a quality of the channel between second base station 405-2 and first cooperative UE 420-1 and a quality of channel between second base station 405-2 and second cooperative UE 420-2. In such cases, second cooperative UE 420-2 may establish a connection with the one of first base station 405-1 or second base station 405-2 that provides a more reliable link to the radio access network when communications are handed over from first cooperative UE 420-1 to second cooperative UE 420-2.

At block 450, target UE 415 may select second cooperative UE 420-2 to replace first cooperative UE 420-1 within virtual UE 422, as similarly described with reference to FIG. 3. In some examples, in addition to considering the channels between first base station 405-1, first cooperative UE 420-1, and second cooperative UE 420-2, the channels between second base station 405-2, first cooperative UE 420-1, and second cooperative UE 420-2 may be considered in determining whether to select second cooperative UE 420-2.

At arrow 455, a random-access procedure may be trigged for second cooperative UE 420-2. In some examples, target UE 415 triggers second cooperative UE 420-2 to perform the random-access procedure. In some examples, first cooperative UE 420-1 triggers second cooperative UE 420-2 to perform the random-access procedure. In some examples, second cooperative UE 420-2 triggers the random-access procedure based on determining that second cooperative UE 420-2 has been selected to form virtual UE 422.

At arrow 460, first base station 405-1 and target UE 415 may continue to exchange data via the direct link between first base station 405-1 and target UE 415, as similarly described with reference to arrow 360 of FIG. 3.

At arrow 465, second cooperative UE 420-2 and second base station 405-2 may exchange signaling associated with a random-access procedure. In some examples, second cooperative UE 420-2 initiates the random-access procedure with second base station 405-2 based on determining that a quality of a channel between second base station 405-2 and second cooperative UE 420-2 is better than a quality of a channel between first base station 405-1 and second cooperative UE 420-2. After completion of the random-access procedure, second cooperative UE 420-2 may establish a connection with second base station 405-2.

At arrow 470, second base station 405-2 may communicate with target UE 415 via second cooperative UE 420-2. In some examples, second base station 405-2 may transmit a communication for target UE 415. Second cooperative UE 420-2 may receive the communication and may relay data received in the communication to target UE 415 via a link (e.g., a sidelink, Wi-Fi link, Bluetooth link, etc.) between second cooperative UE 420-2 and target UE 415. Similarly, target UE 415 may transmit data associated with the radio access network in a communication to second cooperative UE 420-2. And second cooperative UE 420-2 may relay the data to second base station 405-2. Communications between target UE 415 and multiple base stations (e.g., first base station 405-1 and second base station 405-2) may be referred to as multi-TRP communications.

Figure 5:
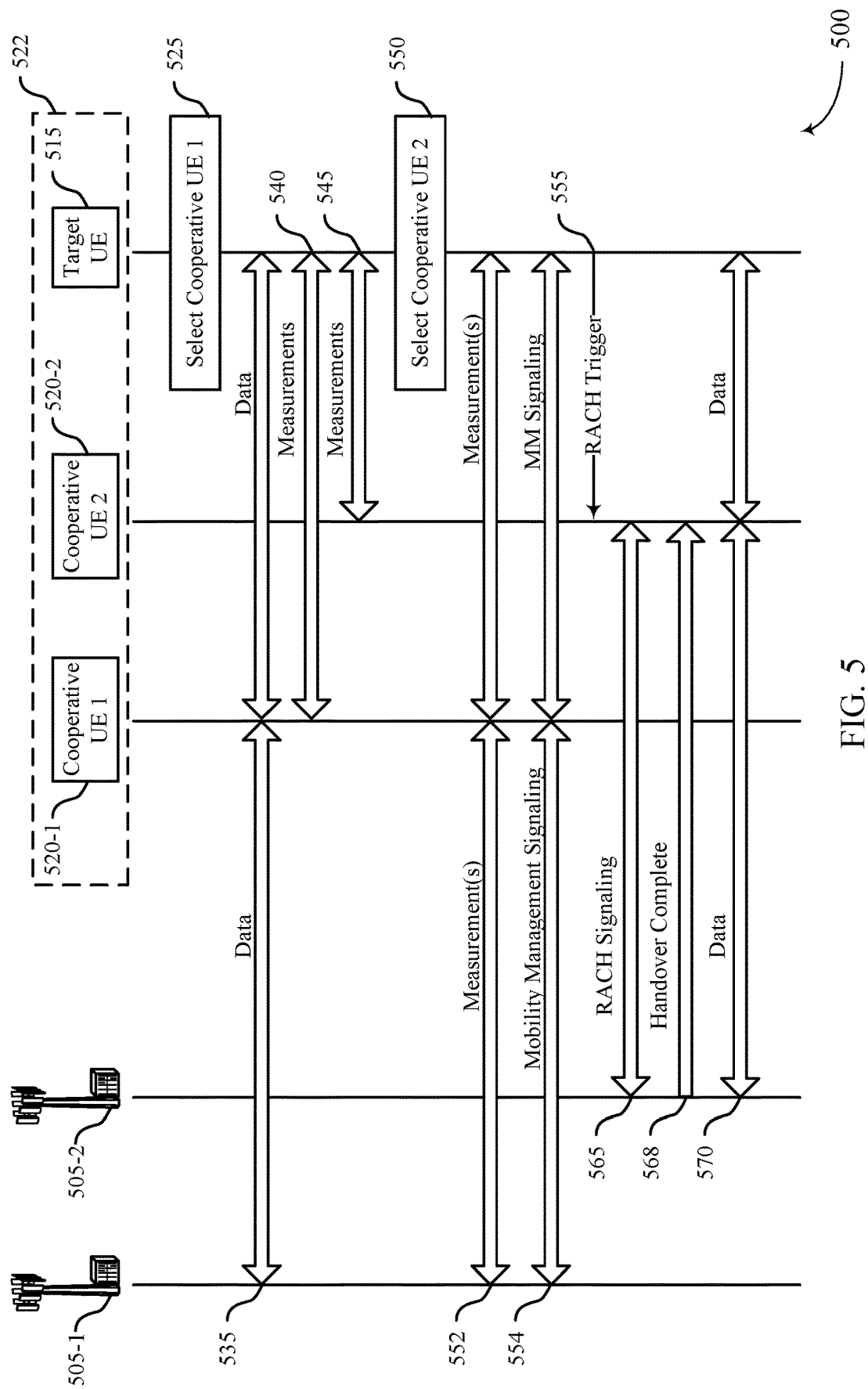

FIG. 5 illustrates an example of a set of operations for cooperative user equipment switching in accordance with aspects of the present disclosure.

Process flow 500 may be performed by first base station 505-1 and second base station 505-2, which may be examples of a base station described with reference to FIGS. 1 through 4, and target UE 515, first cooperative UE 520-1, and second cooperative UE 520-2, which may be examples of a UE described with reference to FIGS. 1 through 4. In some examples, process flow 500 illustrates an exemplary sequence of operations performed to support cooperative user equipment switching. For example, process flow 500 depicts operations for handing communications over from one cooperative UE to another cooperative UE by triggering mobility management procedures.

It is understood that one or more of the operations described in process flow 500 may be performed earlier or later in the process, omitted, replaced, supplemented, or combined with another operation. Also, additional operations described herein that are not included in process flow 500 may be included.

At block 525, target UE 515 may select first cooperative UE 520-1 for forming virtual UE 522, as similarly described with reference to block 425 of FIG. 4. At arrow 535, target UE 515 may exchange data with first base station 505-1, as similarly described with reference to arrow 435 of FIG. 4. In some examples, a direct link between target UE 515 and one of first base station 505-1 or second base station 505-2 may not be established—e.g., based on one or more blockages between first base station 505-1, second base station 505-2, and target UE 515.

At arrow 540 and arrow 545, target UE 515 may obtain measurements associated with communicating with the radio access network via first cooperative UE 520-1, second cooperative UE 520-2, first base station 505-1, second base station 505-2, or any combination thereof, as similarly described with reference to arrow 440 and arrow 445 of FIG. 4. At block 550, target UE 515 may select second cooperative UE 520-2 to replace first cooperative UE 520-1 within virtual UE 522, as similarly described with reference to FIG. 4.

At arrow 552, target UE 515 may transmit, to first base station 505-1 via first cooperative UE 520-1, measurements associated with communications between the radio access network and first cooperative UE 520-1 and second cooperative UE 520-2. In some examples, the measurements include a first set of measurements associated with a first channel between first base station 505-1 and first cooperative UE 520-1 and a second set of measurements associated with a second channel between second base station 505-2 and second cooperative UE 520-2. In some examples, the second set of measurements indicate that the second channel is better than the first channel.

At arrow 554, first base station 505-1 may exchange mobility management signaling with first cooperative UE 520-1. The mobility management signaling may indicate that a handover process of target UE 515 from first base station 505-1 to second base station 505-2 has been initiated—e.g., based on the received measurements. First cooperative UE 520-1 may receive and relay the mobility management signaling to target UE 515.

At arrow 555, a random-access procedure may be triggered for second cooperative UE 520-2, as similarly described with reference to arrow 455 of FIG. 4. In some examples, the random-access procedure is triggered for second cooperative UE 520-2 based on receiving the mobility management signaling.

At arrow 565, second cooperative UE 520-2 and second base station 505-2 may exchange signaling associated with a random-access procedure, as similarly described with reference to FIG. 4. In some examples, second cooperative UE 520-2 initiates the random-access procedure with second base station 505-2 based on the mobility management signaling indicating that target UE 515 is to be handed over from first base station 505-1 to second base station 505-2.

At arrow 568, second base station 505-2 may indicate to second cooperative UE 520-2 that the handover procedure is complete and that a link has been established between second base station 505-2 and target UE 515—via second cooperative UE 520-2. In some examples, second cooperative UE 520-2 indicates to target UE 515 that the handover procedure is completed after receiving the corresponding message from second base station 505-2.

At arrow 570, second base station 505-2 may communicate with target UE 515 via second cooperative UE 520-2, as similarly described with reference to FIG. 4.

Figure 6:
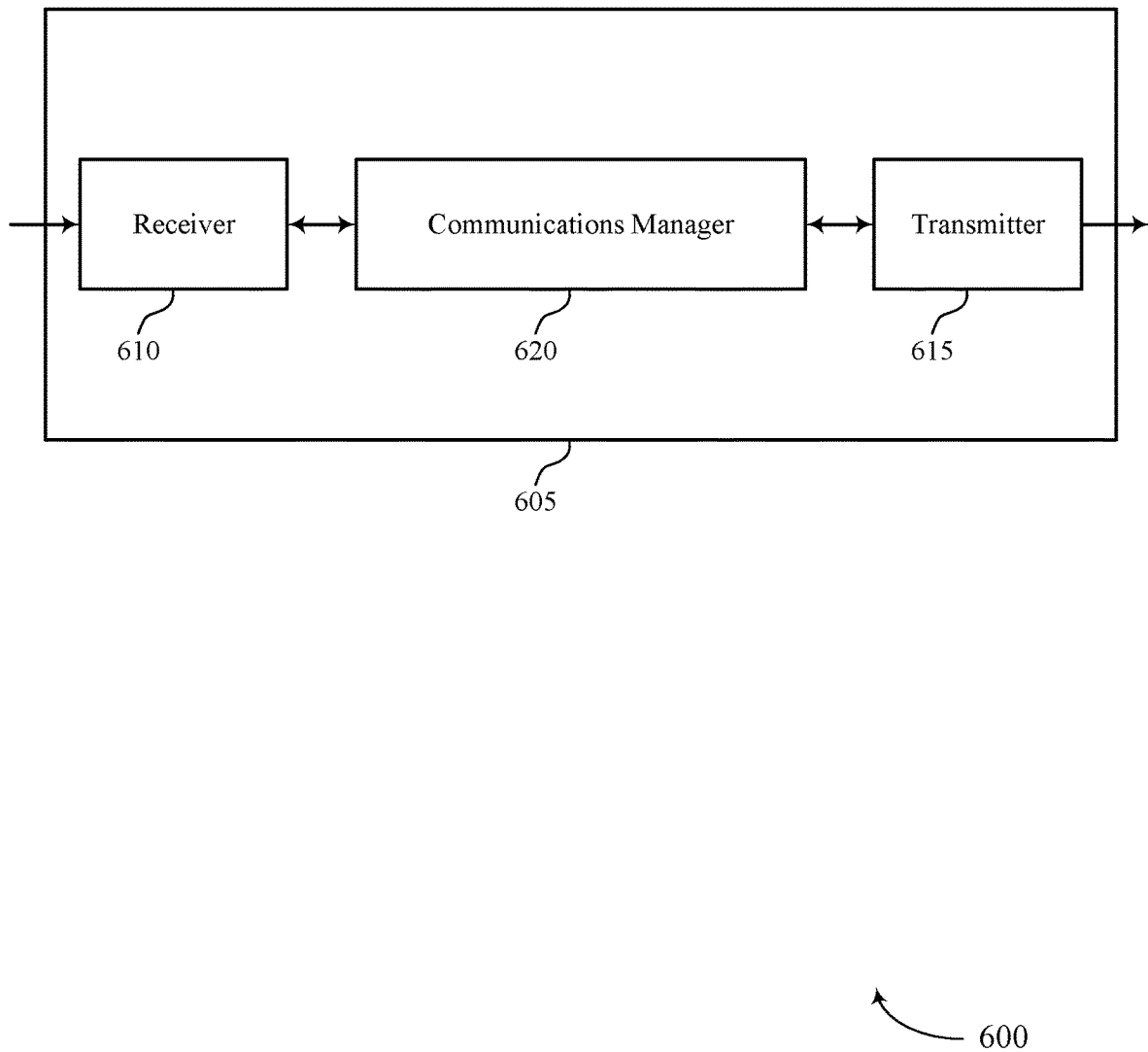
FIGS. 6 and 7 show block diagrams of devices that support cooperative user equipment switching in accordance with aspects of the present disclosure.

FIG. 6 shows a block diagram 600 of a device 605 that supports cooperative user equipment switching in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to cooperative user equipment switching). Information may be passed on to other components of the device 605. The receiver 610 may utilize a single antenna or a set of multiple antennas.

The transmitter 615 may provide a means for transmitting signals generated by other components of the device 605.

For example, the transmitter 615 may transmit information such as packets, user data, control information, or any combination thereof associated with various information channels (e.g., control channels, data channels, information channels related to cooperative user equipment switching). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of cooperative user equipment switching as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a second cooperative UE in accordance with examples as disclosed herein. For example, the communications manager 620 may be configured as or otherwise support a means for receiving, from a target UE that forms a virtual UE with a first cooperative UE, an indication that the second cooperative UE has been selected to replace the first cooperative UE within the virtual UE, the first cooperative UE being served by a base station. The communications manager 620 may be configured as or otherwise support a means for selecting, during a beam management procedure and based on the second cooperative UE being selected, a beam for communicating with the base station. The communications manager 620 may be configured as or otherwise support a means for relaying, basing at least in part on selecting the beam, data received from the base station to the target UE.

Additionally, or alternatively, the communications manager 620 may support wireless communication at a second cooperative UE in accordance with examples as disclosed herein. For example, the communications manager 620 may be configured as or otherwise support a means for receiving, from a target UE that forms a virtual UE with a first cooperative UE, an indication that the second cooperative UE has been selected to replace the first cooperative UE within the virtual UE, the first cooperative UE served by a first base station. The communications manager 620 may be configured as or otherwise support a means for transmitting, to a second base station in a random-access channel and based on receiving the indication, a message associated with establishing a connection between the second base station and the second cooperative UE. The communications manager 620 may be configured as or otherwise support a means for establishing the connection with the second base station based on transmitting the message. The communications manager 620 may be configured as or otherwise support a means for relaying, basing at least in part on establishing the connection with the second base station, data received from the second base station to the target UE.

Additionally, or alternatively, the communications manager 620 may support wireless communication at a first cooperative UE in accordance with examples as disclosed herein. For example, the communications manager 620 may be configured as or otherwise support a means for receiving, from a target UE that forms a virtual UE with the first cooperative UE, an indication that a second cooperative UE has been selected to replace the first cooperative UE within the virtual UE, the first cooperative UE being served by a first base station. The communications manager 620 may be configured as or otherwise support a means for receiving, from the target UE, a first measurement of a quality of signals associated with the first cooperative UE and the first base station, a second measurement of a quality of signals associated with the second cooperative UE and a second base station, or both. The communications manager 620 may be configured as or otherwise support a means for transmitting, to the first base station, a message including at least one of the first measurement or the second measurement. The communications manager 620 may be configured as or otherwise support a means for receiving, from the first base station, an indication that a handover procedure to the second base station has been initiated for the target UE based on the message. The communications manager 620 may be configured as or otherwise support a means for transmitting, to the target UE, the indication of the handover procedure.

Additionally, or alternatively, the communications manager 620 may support wireless communication at a target UE in accordance with examples as disclosed herein. For example, the communications manager 620 may be configured as or otherwise support a means for operating as part of a virtual UE with a first cooperative UE. The communications manager 620 may be configured as or otherwise support a means for detecting, while operating as part of the virtual UE with the first cooperative UE, a quality of first signals associated with the first cooperative UE and a quality of second signals associated with a second cooperative UE. The communications manager 620 may be configured as or otherwise support a means for selecting, based on the detecting, the second cooperative UE to replace the first cooperative UE within the virtual UE. The communications manager 620 may be configured as or otherwise support a means for receiving, via the second cooperative UE, data based on selecting the second cooperative UE to replace the first cooperative UE.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for seamlessly handing over communications between cooperative UEs, which may increase a throughput of communications between devices.

Figure 7:
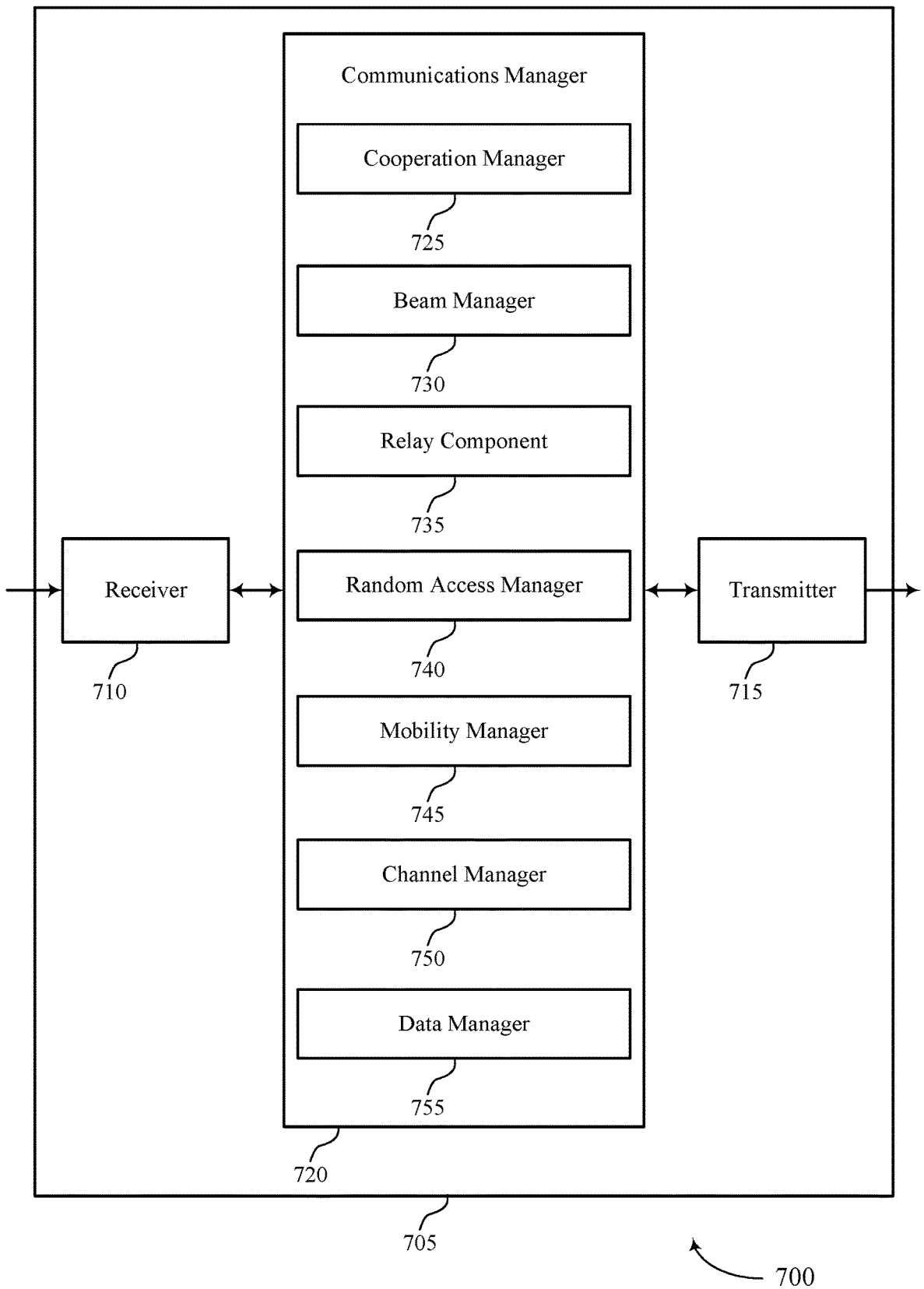

FIG. 7 shows a block diagram 700 of a device 705 that supports cooperative user equipment switching in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to cooperative user equipment switching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to cooperative user equipment switching). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of cooperative user equipment switching as described herein. For example, the communications manager 720 may include a cooperation manager 725, a beam manager 730, a relay component 735, a random-access manager 740, a mobility manager 745, a channel manager 750, a data manager 755, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a second cooperative UE in accordance with examples as disclosed herein. The cooperation manager 725 may be configured as or otherwise support a means for receiving, from a target UE that forms a virtual UE with a first cooperative UE, an indication that the second cooperative UE has been selected to replace the first cooperative UE within the virtual UE, the first cooperative UE being served by a base station. The beam manager 730 may be configured as or otherwise support a means for selecting, during a beam management procedure and based on the second cooperative UE being selected, a beam for communicating with the base station. The relay component 735 may be configured as or otherwise support a means for relaying, based on selecting the beam, data received from the base station to the target UE.

Additionally, or alternatively, the communications manager 720 may support wireless communication at a second cooperative UE in accordance with examples as disclosed herein. The cooperation manager 725 may be configured as or otherwise support a means for receiving, from a target UE that forms a virtual UE with a first cooperative UE, an indication that the second cooperative UE has been selected to replace the first cooperative UE within the virtual UE, the first cooperative UE served by a first base station. The random-access manager 740 may be configured as or otherwise support a means for transmitting, to a second base station in a random-access channel and based on receiving the indication, a message associated with establishing a connection between the second base station and the second cooperative UE. The random-access manager 740 may be configured as or otherwise support a means for establishing the connection with the second base station based on transmitting the message. The relay component 735 may be configured as or otherwise support a means for relaying, based on establishing the connection with the second base station, data received from the second base station to the target UE.

Additionally, or alternatively, the communications manager 720 may support wireless communication at a first cooperative UE in accordance with examples as disclosed herein. The cooperation manager 725 may be configured as or otherwise support a means for receiving, from a target UE that forms a virtual UE with the first cooperative UE, an indication that a second cooperative UE has been selected to replace the first cooperative UE within the virtual UE, the first cooperative UE being served by a first base station. The mobility manager 745 may be configured as or otherwise support a means for receiving, from the target UE, a first measurement of a quality of signals associated with the first cooperative UE and the first base station, a second measurement of a quality of signals associated with the second cooperative UE and a second base station, or both. The mobility manager 745 may be configured as or otherwise support a means for transmitting, to the first base station, a message including at least one of the first measurement or the second measurement. The mobility manager 745 may be configured as or otherwise support a means for receiving, from the first base station, an indication that a handover procedure to the second base station has been initiated for the target UE based on the message. The relay component 735 may be configured as or otherwise support a means for transmitting, to the target UE, the indication of the handover procedure.

Additionally, or alternatively, the communications manager 720 may support wireless communication at a target UE in accordance with examples as disclosed herein. The cooperation manager 725 may be configured as or otherwise support a means for operating as part of a virtual UE with a first cooperative UE. The channel manager 750 may be configured as or otherwise support a means for detecting, while operating as part of the virtual UE with the first cooperative UE, a quality of first signals associated with the first cooperative UE and a quality of second signals associated with a second cooperative UE. The cooperation manager 725 may be configured as or otherwise support a means for selecting, based on the detecting, the second cooperative UE to replace the first cooperative UE within the virtual UE. The data manager 755 may be configured as or otherwise support a means for receiving, via the second cooperative UE, data based on selecting the second cooperative UE to replace the first cooperative UE.

Figure 8:
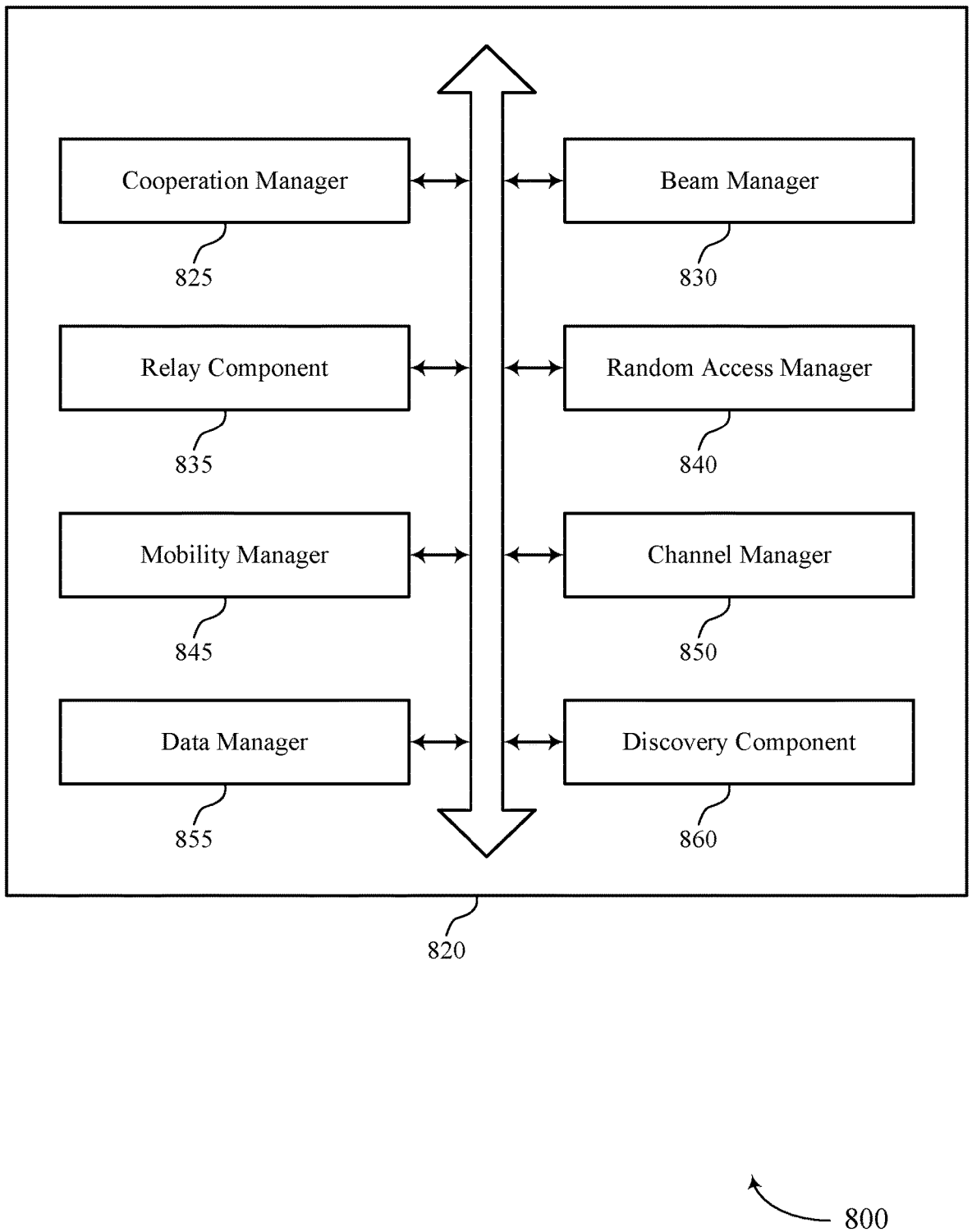
FIG. 8 shows a block diagram of a communications manager that supports cooperative user equipment switching in accordance with aspects of the present disclosure.

FIG. 8 shows a block diagram 800 of a communications manager 820 that supports cooperative user equipment switching in accordance with aspects of the present disclosure. The communications manager 820 may be an example of aspects of a communications manager 620, a communications manager 720, or both, as described herein. The communications manager 820, or various components thereof, may be an example of means for performing various aspects of cooperative user equipment switching as described herein. For example, the communications manager 820 may include a cooperation manager 825, a beam manager 830, a relay component 835, a random-access manager 840, a mobility manager 845, a channel manager 850, a data manager 855, a discovery component 860, or any combination thereof. Each of these components may communicate, directly or indirectly, with one another (e.g., via one or more buses).

The communications manager 820 may support wireless communication at a second cooperative UE in accordance with examples as disclosed herein. The cooperation manager 825 may be configured as or otherwise support a means for receiving, from a target UE that forms a virtual UE with a first cooperative UE, an indication that the second cooperative UE has been selected to replace the first cooperative UE within the virtual UE, the first cooperative UE being served by a base station. The beam manager 830 may be configured as or otherwise support a means for selecting, during a beam management procedure and based on the second cooperative UE being selected, a beam for communicating with the base station. The relay component 835 may be configured as or otherwise support a means for relaying, based on selecting the beam, data received from the base station to the target UE.

In some examples, the beam manager 830 may be configured as or otherwise support a means for transmitting, to the base station and based on receiving the indication, a signal that causes the beam management procedure to be initiated at the base station.

In some examples, the cooperation manager 825 may be configured as or otherwise support a means for communicating, to the target UE, signaling associated with channel conditions for the second cooperative UE, where the indication that the second cooperative UE has been selected to replace the first cooperative UE received based on the channel conditions for the second cooperative UE.

In some examples, the signaling associated with the channel conditions for the second cooperative UE includes at least one of messaging associated with a quality of signals received at the second cooperative UE from the base station, or reference signals associated with a channel between the second cooperative UE and the target UE.

In some examples, to support selecting the beam, the beam manager 830 may be configured as or otherwise support a means for selecting, during the beam management procedure, a second beam index that is different than a first beam index associated with communications between the first cooperative UE and the base station.

In some examples, to support selecting the beam, the beam manager 830 may be configured as or otherwise support a means for selecting, during the beam management procedure, a beam index that is the same as a beam index associated with communications between the first cooperative UE and the base station.

In some examples, the beam management procedure includes a beam failure recovery procedure.

In some examples, the discovery component 860 may be configured as or otherwise support a means for broadcasting an identity of the second cooperative UE, where the indication that the second cooperative UE has been selected is received based on the broadcasting. In some examples, the cooperation manager 825 may be configured as or otherwise support a means for operating as part of the virtual UE with the target UE based on being selected to replace the first cooperative UE.

In some examples, a second beam for communicating with the base station is configured for the first cooperative UE and a third beam for communicating with the base station is configured for the target UE when the beam is selected for the second cooperative UE, and the second beam is disabled based at least in part on the second beam being selected for the cooperative UE.

Additionally, or alternatively, the communications manager 820 may support wireless communication at a second cooperative UE in accordance with examples as disclosed herein. In some examples, the cooperation manager 825 may be configured as or otherwise support a means for receiving, from a target UE that forms a virtual UE with a first cooperative UE, an indication that the second cooperative UE has been selected to replace the first cooperative UE within the virtual UE, the first cooperative UE served by a first base station. The random-access manager 840 may be configured as or otherwise support a means for transmitting, to a second base station in a random-access channel and based on receiving the indication, a message associated with establishing a connection between the second base station and the second cooperative UE. In some examples, the random-access manager 840 may be configured as or otherwise support a means for establishing the connection with the second base station based on transmitting the message. In some examples, the relay component 835 may be configured as or otherwise support a means for relaying, based on establishing the connection with the second base station, data received from the second base station to the target UE.

In some examples, the cooperation manager 825 may be configured as or otherwise support a means for communicating, to the target UE, signaling associated with channel conditions for the second cooperative UE, where the indication that the second cooperative UE has been selected to replace the first cooperative UE is received based on the channel conditions for the second cooperative UE.

In some examples, the signaling associated with communicating with the second base station includes at least one of messaging associated with a quality of signals received at the second cooperative UE from the second base station, or reference signals associated with a channel between the second cooperative UE and the target UE.

Additionally, or alternatively, the communications manager 820 may support wireless communication at a first cooperative UE in accordance with examples as disclosed herein. In some examples, the cooperation manager 825 may be configured as or otherwise support a means for receiving, from a target UE that forms a virtual UE with the first cooperative UE, an indication that a second cooperative UE has been selected to replace the first cooperative UE within the virtual UE, the first cooperative UE being served by a first base station. The mobility manager 845 may be configured as or otherwise support a means for receiving, from the target UE, a first measurement of a quality of signals associated with the first cooperative UE and the first base station, a second measurement of a quality of signals associated with the second cooperative UE and a second base station, or both. In some examples, the mobility manager 845 may be configured as or otherwise support a means for transmitting, to the first base station, a message including at least one of the first measurement or the second measurement. In some examples, the mobility manager 845 may be configured as or otherwise support a means for receiving, from the first base station, an indication that a handover procedure to the second base station has been initiated for the target UE based on the message. In some examples, the relay component 835 may be configured as or otherwise support a means for transmitting, to the target UE, the indication of the handover procedure.

In some examples, the relay component 835 may be configured as or otherwise support a means for relaying data received from the first base station to the target UE before receiving the indication that the second cooperative UE has been selected to replace the first cooperative UE.

In some examples, the message initiates a mobility management procedure or a beam management procedure based on receiving the indication that the second cooperative UE has been selected to replace the first cooperative UE.

In some examples, the cooperation manager 825 may be configured as or otherwise support a means for receiving, based on the handover procedure being initiated, an indication that a second connection between the second cooperative UE and the second base station has been established. In some examples, the cooperation manager 825 may be configured as or otherwise support a means for disabling a first connection between the first cooperative UE and the first base station based on the indication that the second connection has been established.

Additionally, or alternatively, the communications manager 820 may support wireless communication at a target UE in accordance with examples as disclosed herein. In some examples, the cooperation manager 825 may be configured as or otherwise support a means for operating as part of a virtual UE with a first cooperative UE. The channel manager 850 may be configured as or otherwise support a means for detecting, while operating as part of the virtual UE with the first cooperative UE, a quality of first signals associated with the first cooperative UE and a quality of second signals associated with a second cooperative UE. In some examples, the cooperation manager 825 may be configured as or otherwise support a means for selecting, based on the detecting, the second cooperative UE to replace the first cooperative UE within the virtual UE. The data manager 855 may be configured as or otherwise support a means for receiving, via the second cooperative UE, data based on selecting the second cooperative UE to replace the first cooperative UE.

In some examples, the data manager 855 may be configured as or otherwise support a means for establishing a connection with a base station. In some examples, the data manager 855 may be configured as or otherwise support a means for receiving, from the base station and while operating as part of the virtual UE with the first cooperative UE, second data via the connection and the first cooperative UE.

In some examples, the cooperation manager 825 may be configured as or otherwise support a means for operating as part of the virtual UE with the second cooperative UE based on selecting the second cooperative UE to replace the first cooperative UE. In some examples, the data manager 855 may be configured as or otherwise support a means for receiving, from the base station and while operating as part of the virtual UE with the second cooperative UE, third data via the connection and the second cooperative UE.

In some examples, to support operating as part of the virtual UE with the second cooperative UE, the cooperation manager 825 may be configured as or otherwise support a means for establishing a second connection with the second cooperative UE based on selecting the second cooperative UE to replace the first cooperative UE. In some examples, to support operating as part of the virtual UE with the second cooperative UE, the cooperation manager 825 may be configured as or otherwise support a means for disabling a first connection with the first cooperative UE based on establishing the second connection with the second cooperative UE.

In some examples, the beam manager 830 may be configured as or otherwise support a means for transmitting, to the first cooperative UE and based on selecting the second cooperative UE to replace the first cooperative UE, a message directing the first cooperative UE to initiate a beam management procedure for a base station serving the first cooperative UE.

In some examples, the cooperation manager 825 may be configured as or otherwise support a means for establishing a second connection with the second cooperative UE based on an indication that the second cooperative UE has selected a beam index during the beam management procedure. In some examples, the cooperation manager 825 may be configured as or otherwise support a means for disabling a first connection with the first cooperative UE after establishing the second connection with the second cooperative UE, where the second cooperative UE replaces the first cooperative UE within the virtual UE based on establishing the second connection and disabling the first connection.

In some examples, the beam manager 830 may be configured as or otherwise support a means for transmitting, to a base station that has a connection with the first cooperative UE and based on selecting the second cooperative UE to replace the first cooperative UE, a message to initiate a beam management procedure for the second cooperative UE.

In some examples, to detect the quality of the first signals, the channel manager 850 may be configured as or otherwise support a means for at least one of receiving a first message including an indication of a quality of first signaling between the first cooperative UE and a base station that has a connection with the first cooperative UE or performing measurements on first signaling between the first cooperative UE and the target UE.

In some examples, to detect the quality of the second signals, the channel manager 850 may be configured as or otherwise support a means for at least one of receiving a second message including an indication of a quality of second signaling between the second cooperative UE and the base station or performing measurements on second signaling between the second cooperative UE and the target UE.

In some examples, the first cooperative UE has a first connection with a first base station, the first signals include at least one of first signaling between the first cooperative UE and the first base station or second signaling between the first cooperative UE and the target UE, and the second signals include at least one of first signaling between the second cooperative UE and a second base station or second signaling between the second cooperative UE and the target UE.

In some examples, to detect the quality of the first signals, the channel manager 850 may be configured as or otherwise support a means for at least one of receiving at least one of a first message including an indication of a quality of signals associated with the first cooperative UE and the first base station or a second message including an indication of a quality of signals associated with the second cooperative UE and the second base station or performing measurements on at least one of first signaling received from the first cooperative UE or second signaling received from the second cooperative UE.

In some examples, the random-access manager 840 may be configured as or otherwise support a means for transmitting, to the second cooperative UE, a message directing the second cooperative UE to initiate a random-access procedure with the second base station based on selecting the second cooperative UE to replace the first cooperative UE.

In some examples, the mobility manager 845 may be configured as or otherwise support a means for transmitting, to the first base station via the first cooperative UE and based on selecting the second cooperative UE to replace the first cooperative UE, a message indicating the quality of the first signaling between the first cooperative UE and the first base station and the quality of the first signaling between the second cooperative UE and the second base station.

In some examples, the mobility manager 845 may be configured as or otherwise support a means for receiving, from the first base station via the first cooperative UE and in response to the message, a second message indicating that a handover procedure for the virtual UE from the first base station to the second base station has been initiated. In some examples, the mobility manager 845 may be configured as or otherwise support a means for transmitting, to the second cooperative UE and based on the second message, a third message directing the second cooperative UE to perform a random-access procedure with the second base station.

In some examples, the mobility manager 845 may be configured as or otherwise support a means for receiving, from the second base station via the second cooperative UE, a fourth message indicating a completion of the handover procedure, where the data originates from the second base station and is received from the second cooperative UE based on the completion of the handover procedure.

Figure 9:
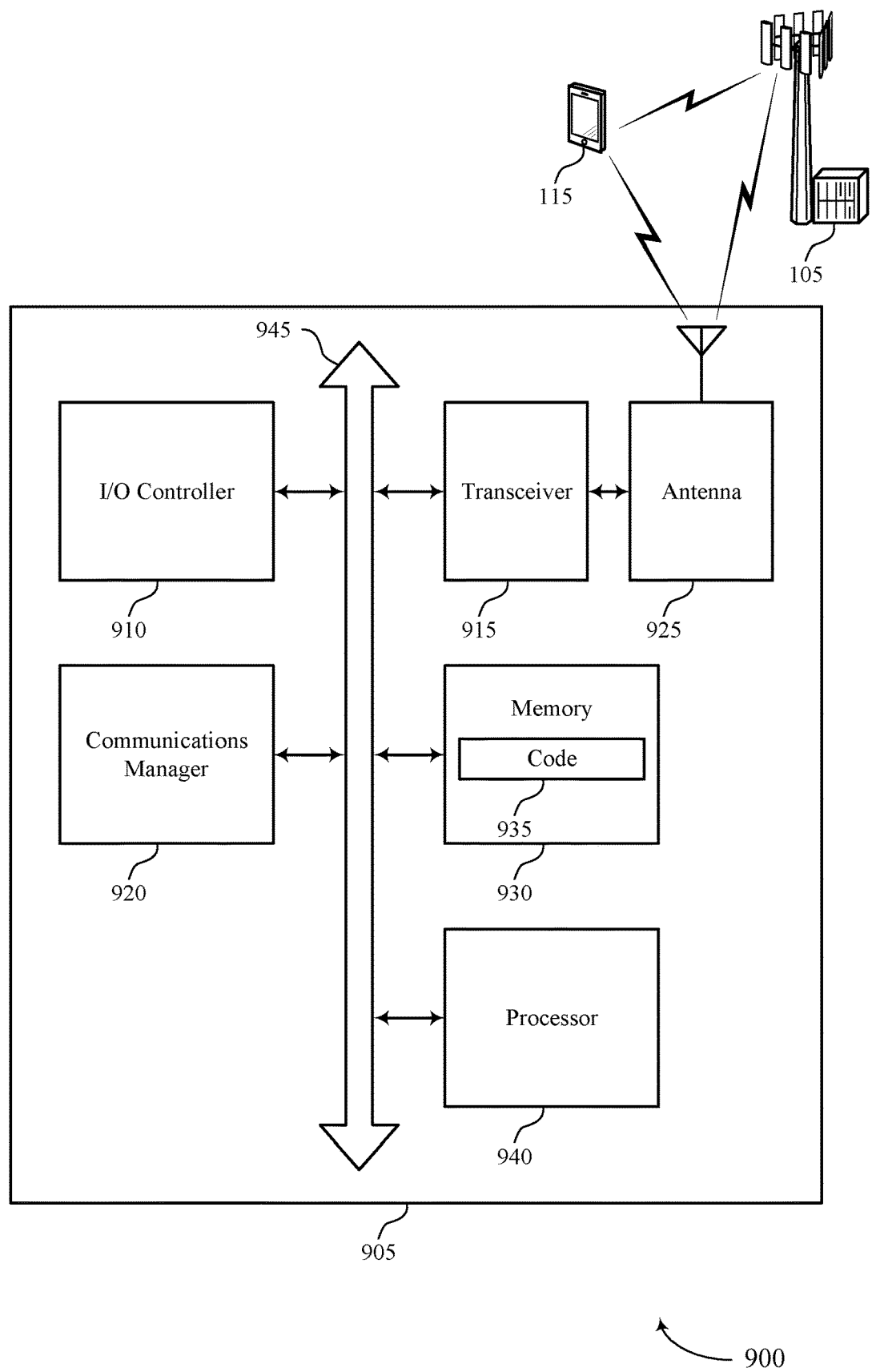
FIG. 9 shows a diagram of a system including a device that supports cooperative user equipment switching in accordance with aspects of the present disclosure.

FIG. 9 shows a diagram of a system 900 including a device 905 that supports cooperative user equipment switching in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random-access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting cooperative user equipment switching). For example, the device 905 or a component of the device 905 may include a processor 940 and memory 930 coupled to the processor 940, the processor 940 and memory 930 configured to perform various functions described herein.

The communications manager 920 may support wireless communication at a second cooperative UE in accordance with examples as disclosed herein. For example, the communications manager 920 may be configured as or otherwise support a means for receiving, from a target UE that forms a virtual UE with a first cooperative UE, an indication that the second cooperative UE has been selected to replace the first cooperative UE within the virtual UE, the first cooperative UE being served by a base station. The communications manager 920 may be configured as or otherwise support a means for selecting, during a beam management procedure and based on the second cooperative UE being selected, a beam for communicating with the base station. The communications manager 920 may be configured as or otherwise support a means for relaying, basing at least in part on selecting the beam, data received from the base station to the target UE.

Additionally, or alternatively, the communications manager 920 may support wireless communication at a second cooperative UE in accordance with examples as disclosed herein. For example, the communications manager 920 may be configured as or otherwise support a means for receiving, from a target UE that forms a virtual UE with a first cooperative UE, an indication that the second cooperative UE has been selected to replace the first cooperative UE within the virtual UE, the first cooperative UE served by a first base station. The communications manager 920 may be configured as or otherwise support a means for transmitting, to a second base station in a random-access channel and based on receiving the indication, a message associated with establishing a connection between the second base station and the second cooperative UE. The communications manager 920 may be configured as or otherwise support a means for establishing the connection with the second base station based on transmitting the message. The communications manager 920 may be configured as or otherwise support a means for relaying, basing at least in part on establishing the connection with the second base station, data received from the second base station to the target UE.

Additionally, or alternatively, the communications manager 920 may support wireless communication at a first cooperative UE in accordance with examples as disclosed herein. For example, the communications manager 920 may be configured as or otherwise support a means for receiving, from a target UE that forms a virtual UE with the first cooperative UE, an indication that a second cooperative UE has been selected to replace the first cooperative UE within the virtual UE, the first cooperative UE being served by a first base station. The communications manager 920 may be configured as or otherwise support a means for receiving, from the target UE, a first measurement of a quality of signals associated with the first cooperative UE and the first base station, a second measurement of a quality of signals associated with the second cooperative UE and a second base station, or both. The communications manager 920 may be configured as or otherwise support a means for transmitting, to the first base station, a message including at least one of the first measurement or the second measurement. The communications manager 920 may be configured as or otherwise support a means for receiving, from the first base station, an indication that a handover procedure to the second base station has been initiated for the target UE based on the message. The communications manager 920 may be configured as or otherwise support a means for transmitting, to the target UE, the indication of the handover procedure.

Additionally, or alternatively, the communications manager 920 may support wireless communication at a target UE in accordance with examples as disclosed herein. For example, the communications manager 920 may be configured as or otherwise support a means for operating as part of a virtual UE with a first cooperative UE. The communications manager 920 may be configured as or otherwise support a means for detecting, while operating as part of the virtual UE with the first cooperative UE, a quality of first signals associated with the first cooperative UE and a quality of second signals associated with a second cooperative UE. The communications manager 920 may be configured as or otherwise support a means for selecting, based on the detecting, the second cooperative UE to replace the first cooperative UE within the virtual UE. The communications manager 920 may be configured as or otherwise support a means for receiving, via the second cooperative UE, data based on selecting the second cooperative UE to replace the first cooperative UE.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of cooperative user equipment switching as described herein, or the processor 940 and the memory 930 may be otherwise configured to perform or support such operations.

Figure 10:
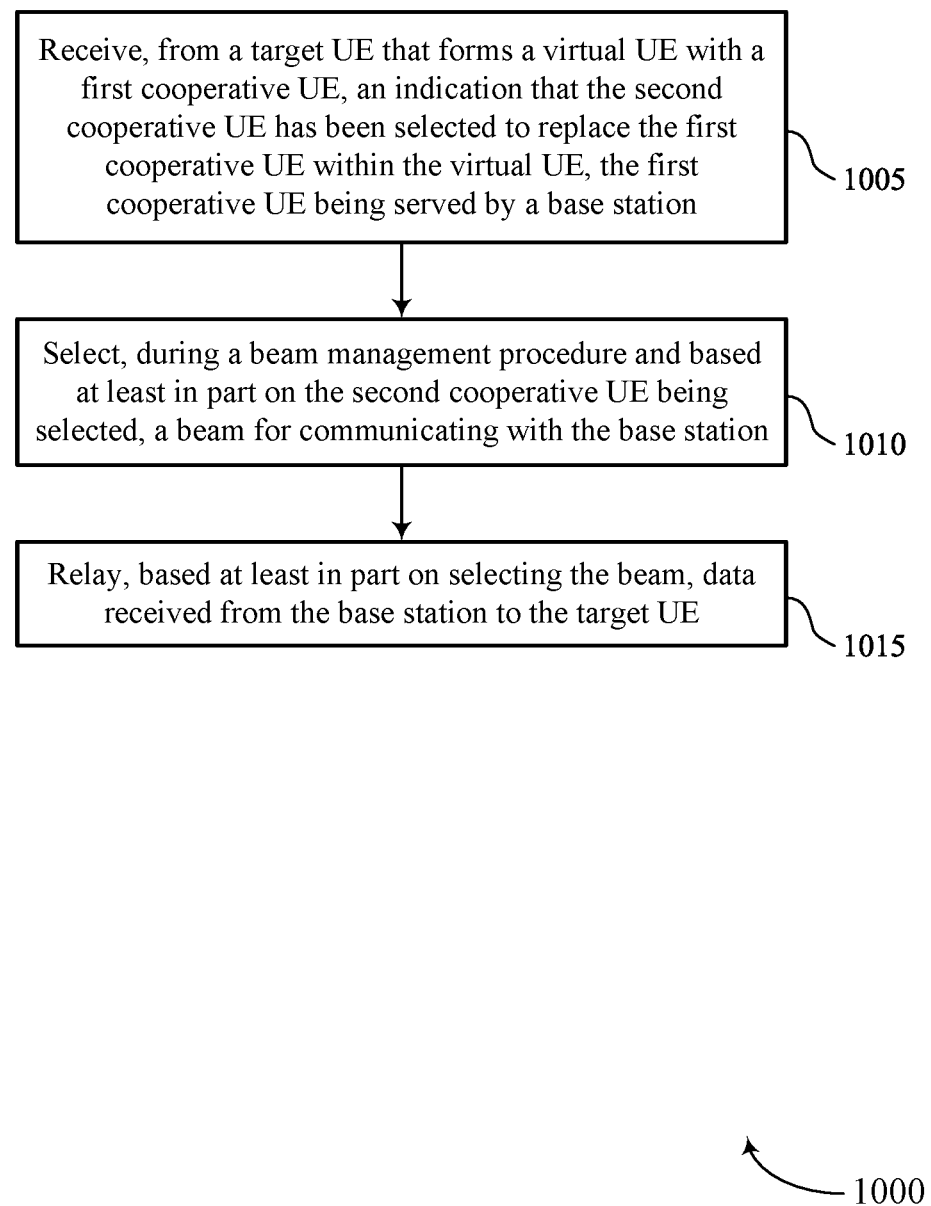
FIGS. 10 through 13 show flowcharts illustrating methods that support cooperative user equipment switching in accordance with aspects of the present disclosure.

FIG. 10 shows a flowchart illustrating a method 1000 that supports cooperative user equipment switching in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving, from a target UE that forms a virtual UE with a first cooperative UE, an indication that the second cooperative UE has been selected to replace the first cooperative UE within the virtual UE, the first cooperative UE being served by a base station. The operations of 1005 may be performed in accordance with examples as disclosed herein. In some examples, aspects of the operations of 1005 may be performed by a cooperation manager 825 as described with reference to FIG. 8.

At 1010, the method may include selecting, during a beam management procedure and based on the second cooperative UE being selected, a beam for communicating with the base station. The operations of 1010 may be performed in accordance with examples as disclosed herein. In some examples, aspects of the operations of 1010 may be performed by a beam manager 830 as described with reference to FIG. 8.

At 1015, the method may include relaying, based on selecting the beam, data received from the base station to the target UE. The operations of 1015 may be performed in accordance with examples as disclosed herein. In some examples, aspects of the operations of 1015 may be performed by a relay component 835 as described with reference to FIG. 8.

Figure 11:
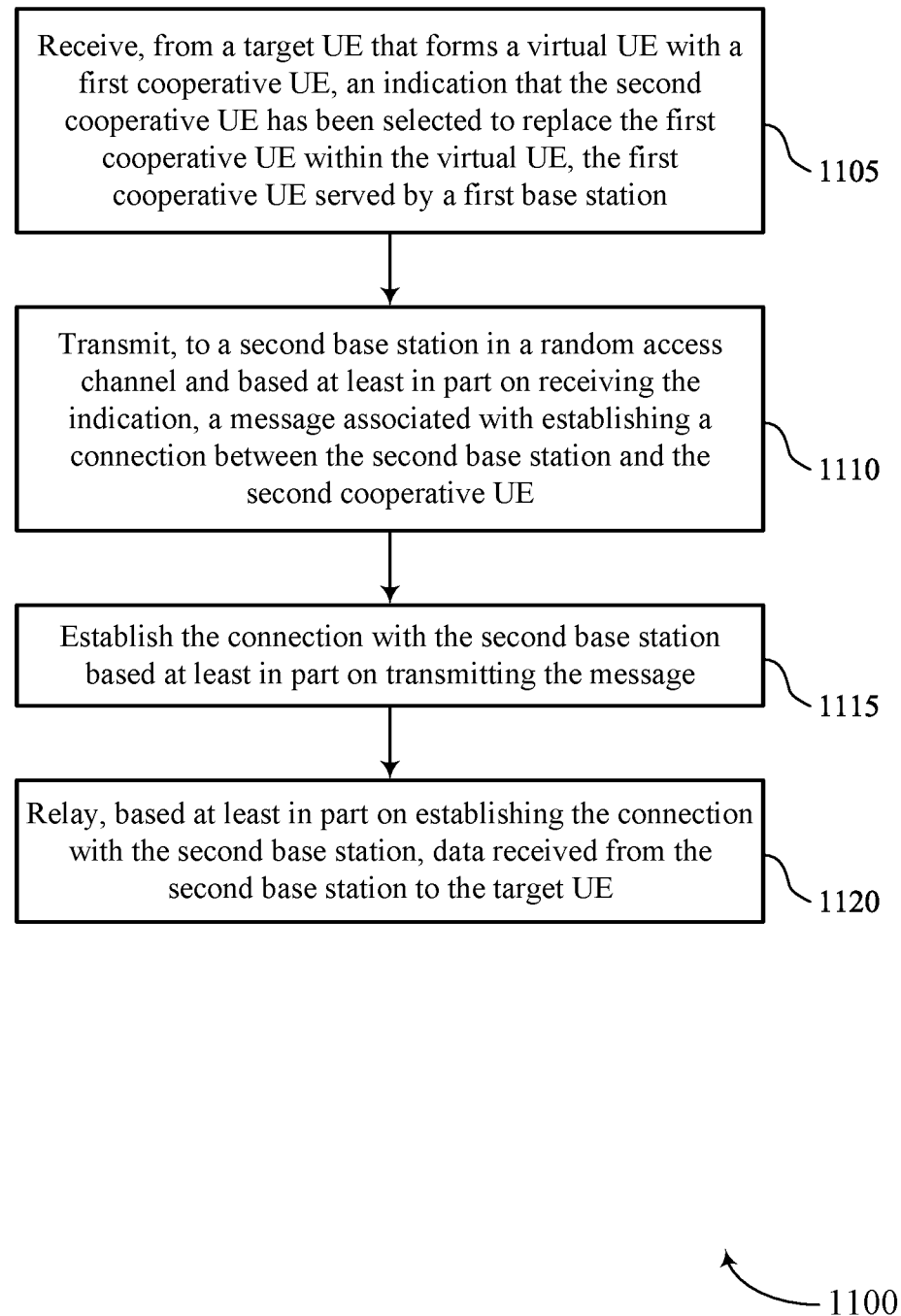

FIG. 11 shows a flowchart illustrating a method 1100 that supports cooperative user equipment switching in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving, from a target UE that forms a virtual UE with a first cooperative UE, an indication that the second cooperative UE has been selected to replace the first cooperative UE within the virtual UE, the first cooperative UE served by a first base station. The operations of 1105 may be performed in accordance with examples as disclosed herein. In some examples, aspects of the operations of 1105 may be performed by a cooperation manager 825 as described with reference to FIG. 8.

At 1110, the method may include transmitting, to a second base station in a random-access channel and based on receiving the indication, a message associated with establishing a connection between the second base station and the second cooperative UE. The operations of 1110 may be performed in accordance with examples as disclosed herein. In some examples, aspects of the operations of 1110 may be performed by a random-access manager 840 as described with reference to FIG. 8.

At 1115, the method may include establishing the connection with the second base station based on transmitting the message. The operations of 1115 may be performed in accordance with examples as disclosed herein. In some examples, aspects of the operations of 1115 may be performed by a random-access manager 840 as described with reference to FIG. 8.

At 1120, the method may include relaying, based on establishing the connection with the second base station, data received from the second base station to the target UE. The operations of 1120 may be performed in accordance with examples as disclosed herein. In some examples, aspects of the operations of 1120 may be performed by a relay component 835 as described with reference to FIG. 8.

Figure 12:
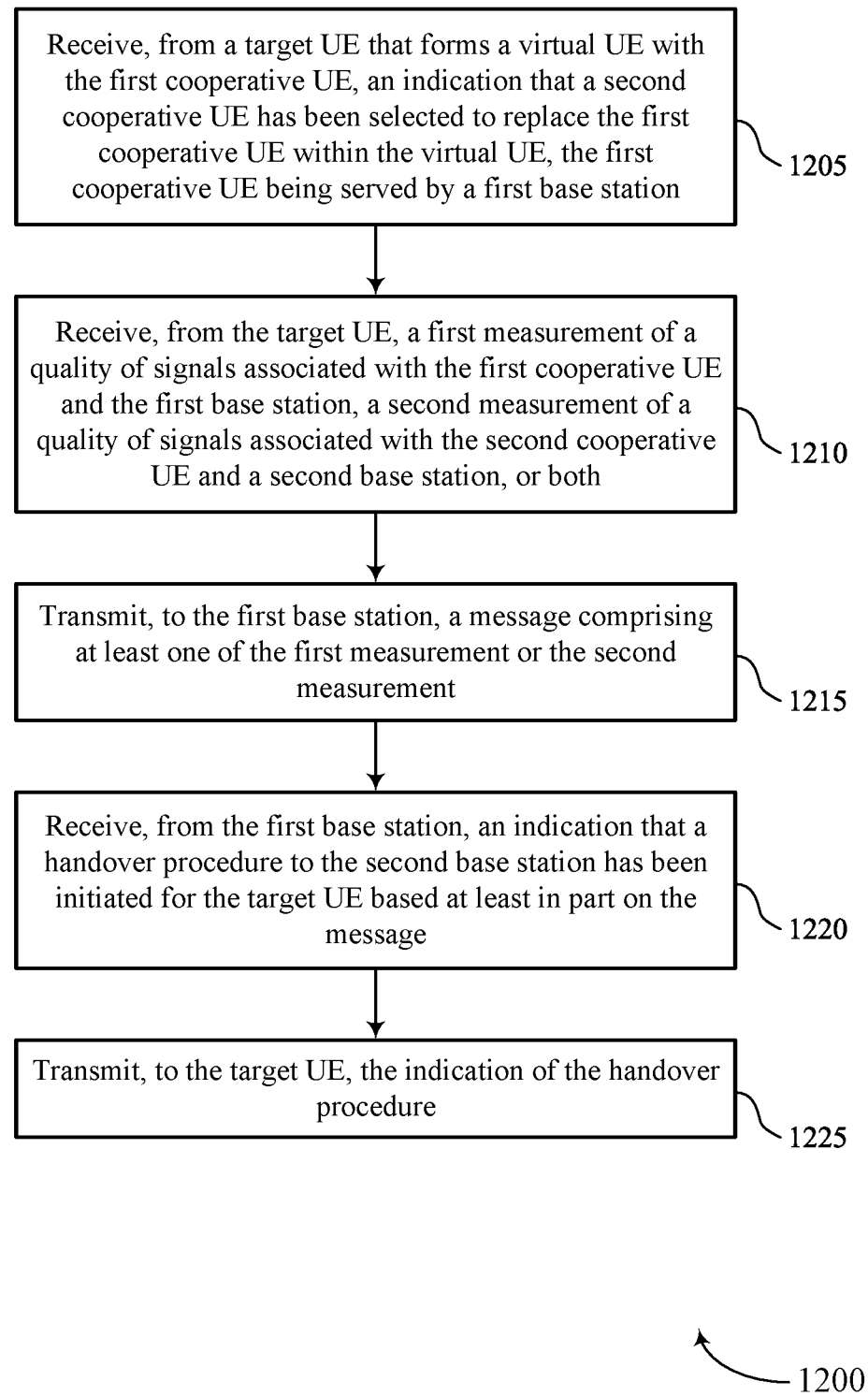

FIG. 12 shows a flowchart illustrating a method 1200 that supports cooperative user equipment switching in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving, from a target UE that forms a virtual UE with the first cooperative UE, an indication that a second cooperative UE has been selected to replace the first cooperative UE within the virtual UE, the first cooperative UE being served by a first base station. The operations of 1205 may be performed in accordance with examples as disclosed herein. In some examples, aspects of the operations of 1205 may be performed by a cooperation manager 825 as described with reference to FIG. 8.

At 1210, the method may include receiving, from the target UE, a first measurement of a quality of signals associated with the first cooperative UE and the first base station, a second measurement of a quality of signals associated with the second cooperative UE and a second base station, or both. The operations of 1210 may be performed in accordance with examples as disclosed herein. In some examples, aspects of the operations of 1210 may be performed by a mobility manager 845 as described with reference to FIG. 8.

At 1215, the method may include transmitting, to the first base station, a message including at least one of the first measurement or the second measurement. The operations of 1215 may be performed in accordance with examples as disclosed herein. In some examples, aspects of the operations of 1215 may be performed by a mobility manager 845 as described with reference to FIG. 8.

At 1220, the method may include receiving, from the first base station, an indication that a handover procedure to the second base station has been initiated for the target UE based on the message. The operations of 1220 may be performed in accordance with examples as disclosed herein. In some examples, aspects of the operations of 1220 may be performed by a mobility manager 845 as described with reference to FIG. 8.

At 1225, the method may include transmitting, to the target UE, the indication of the handover procedure. The operations of 1225 may be performed in accordance with examples as disclosed herein. In some examples, aspects of the operations of 1225 may be performed by a relay component 835 as described with reference to FIG. 8.

Figure 13:
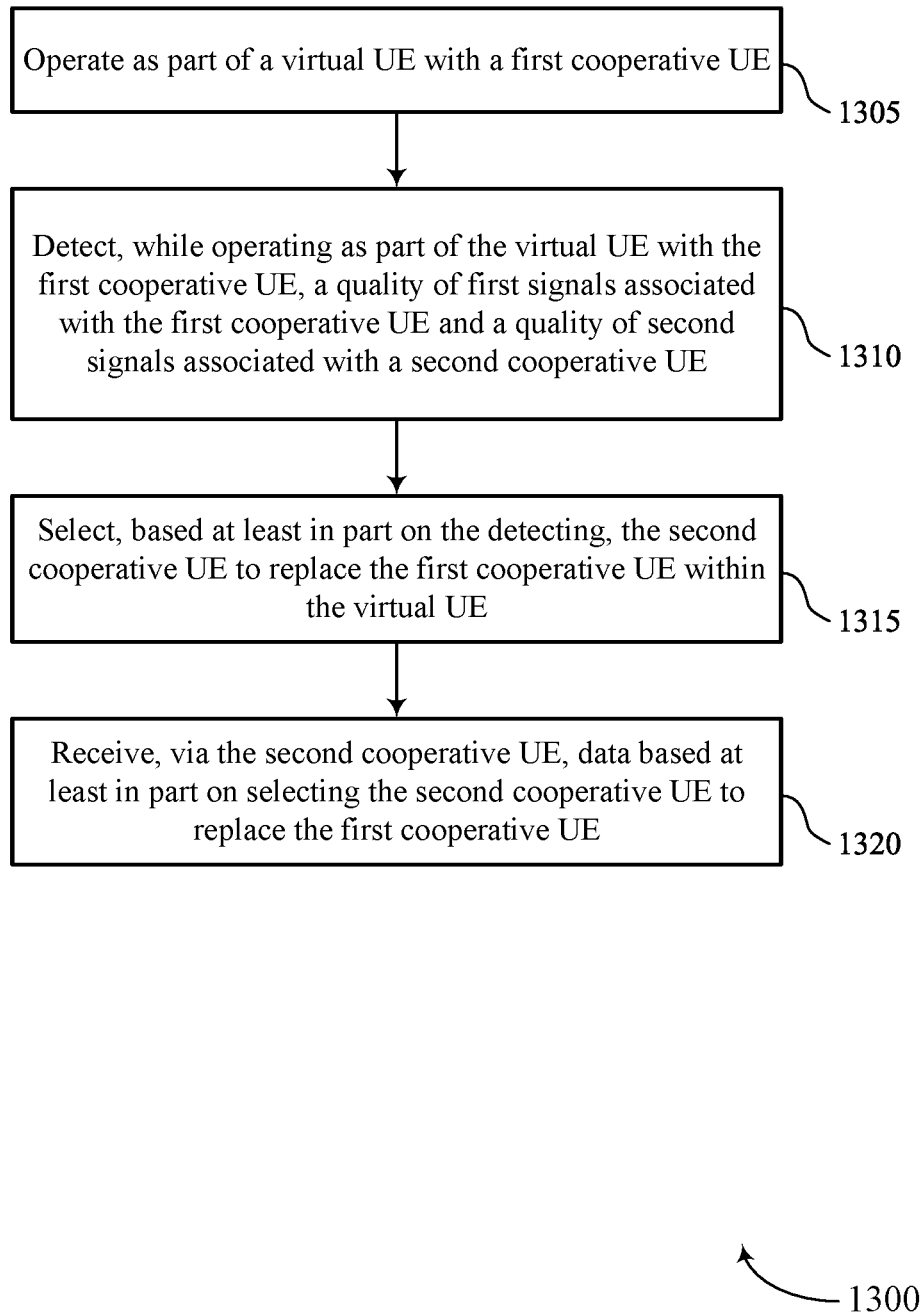

FIG. 13 shows a flowchart illustrating a method 1300 that supports cooperative user equipment switching in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include operating as part of a virtual UE with a first cooperative UE. The operations of 1305 may be performed in accordance with examples as disclosed herein. In some examples, aspects of the operations of 1305 may be performed by a cooperation manager 825 as described with reference to FIG. 8.

At 1310, the method may include detecting, while operating as part of the virtual UE with the first cooperative UE, a quality of first signals associated with the first cooperative UE and a quality of second signals associated with a second cooperative UE. The operations of 1310 may be performed in accordance with examples as disclosed herein. In some examples, aspects of the operations of 1310 may be performed by a channel manager 850 as described with reference to FIG. 8.

At 1315, the method may include selecting, based on the detecting, the second cooperative UE to replace the first cooperative UE within the virtual UE. The operations of 1315 may be performed in accordance with examples as disclosed herein. In some examples, aspects of the operations of 1315 may be performed by a cooperation manager 825 as described with reference to FIG. 8.

At 1320, the method may include receiving, via the second cooperative UE, data based on selecting the second cooperative UE to replace the first cooperative UE. The operations of 1320 may be performed in accordance with examples as disclosed herein. In some examples, aspects of the operations of 1320 may be performed by a data manager 855 as described with reference to FIG. 8.

The following provides an overview of aspects of the present disclosure:

Aspect 1: A method for wireless communication at a second cooperative UE, comprising: receiving, from a target UE that forms a virtual UE with a first cooperative UE, an indication that the second cooperative UE has been selected to replace the first cooperative UE within the virtual UE, the first cooperative UE being served by a base station; selecting, during a beam management procedure and based at least in part on the second cooperative UE being selected, a beam for communicating with the base station; and relaying, based at least in part on selecting the beam, data received from the base station to the target UE.

Aspect 2: The method of aspect 1, further comprising: transmitting, to the base station and based at least in part on receiving the indication, a signal that causes the beam management procedure to be initiated at the base station.

Aspect 3: The method of any of aspects 1 through 2, further comprising: communicating, to the target UE, signaling associated with channel conditions for the second cooperative UE, wherein the indication that the second cooperative UE has been selected to replace the first cooperative UE received based at least in part on the channel conditions for the second cooperative UE.

Aspect 4: The method of aspect 3, wherein the signaling associated with the channel conditions for the second cooperative UE comprises at least one of messaging associated with a quality of signals received at the second cooperative UE from the base station, or reference signals associated with a channel between the second cooperative UE and the target UE.

Aspect 5: The method of any of aspects 1 through 4, wherein selecting the beam comprises: selecting, during the beam management procedure, a second beam index that is different than a first beam index associated with communications between the first cooperative UE and the base station.

Aspect 6: The method of any of aspects 1 through 5, wherein selecting the beam comprises: selecting, during the beam management procedure, a beam index that is the same as a beam index associated with communications between the first cooperative UE and the base station.

Aspect 7: The method of any of aspects 1 through 6, wherein the beam management procedure comprises a beam failure recovery procedure.

Aspect 8: The method of any of aspects 1 through 7, further comprising: broadcasting an identity of the second cooperative UE, wherein the indication that the second cooperative UE has been selected is received based at least in part on the broadcasting; and operating as part of the virtual UE with the target UE based at least in part on being selected to replace the first cooperative UE.

Aspect 9: The method of any of aspects 1 through 8, wherein a second beam for communicating with the base station is configured for the first cooperative UE and a third beam for communicating with the base station is configured for the target UE when the beam is selected for the second cooperative UE, and the second beam is disabled based at least in part on the second beam being selected for the cooperative UE.

Aspect 10: A method for wireless communication at a second cooperative UE, comprising: receiving, from a target UE that forms a virtual UE with a first cooperative UE, an indication that the second cooperative UE has been selected to replace the first cooperative UE within the virtual UE, the first cooperative UE served by a first base station; transmitting, to a second base station in a random access channel and based at least in part on receiving the indication, a message associated with establishing a connection between the second base station and the second cooperative UE; establishing the connection with the second base station based at least in part on transmitting the message; and relaying, based at least in part on establishing the connection with the second base station, data received from the second base station to the target UE.

Aspect 11: The method of aspect 10, further comprising: communicating, to the target UE, signaling associated with channel conditions for the second cooperative UE, wherein the indication that the second cooperative UE has been selected to replace the first cooperative UE is received based at least in part on the channel conditions for the second cooperative UE.

Aspect 12: The method of aspect 11, wherein the signaling associated with communicating with the second base station comprises at least one of messaging associated with a quality of signals received at the second cooperative UE from the second base station, or reference signals associated with a channel between the second cooperative UE and the target UE.

Aspect 13: A method for wireless communication at a first cooperative UE, comprising: receiving, from a target UE that forms a virtual UE with the first cooperative UE, an indication that a second cooperative UE has been selected to replace the first cooperative UE within the virtual UE, the first cooperative UE being served by a first base station; receiving, from the target UE, a first measurement of a quality of signals associated with the first cooperative UE and the first base station, a second measurement of a quality of signals associated with the second cooperative UE and a second base station, or both; transmitting, to the first base station, a message comprising at least one of the first measurement or the second measurement; receiving, from the first base station, an indication that a handover procedure to the second base station has been initiated for the target UE based at least in part on the message; and transmitting, to the target UE, the indication of the handover procedure.

Aspect 14: The method of aspect 13, further comprising: relaying data received from the first base station to the target UE before receiving the indication that the second cooperative UE has been selected to replace the first cooperative UE.

Aspect 15: The method of any of aspects 13 through 14, wherein the message initiates a mobility management procedure or a beam management procedure based at least in part on receiving the indication that the second cooperative UE has been selected to replace the first cooperative UE.

Aspect 16: The method of any of aspects 13 through 15, further comprising: receiving, based at least in part on the handover procedure being initiated, an indication that a second connection between the second cooperative UE and the second base station has been established; and disabling a first connection between the first cooperative UE and the first base station based at least in part on the indication that the second connection has been established.

Aspect 17: A method for wireless communication at a target UE, comprising: operating as part of a virtual UE with a first cooperative UE; detecting, while operating as part of the virtual UE with the first cooperative UE, a quality of first signals associated with the first cooperative UE and a quality of second signals associated with a second cooperative UE; selecting, based at least in part on the detecting, the second cooperative UE to replace the first cooperative UE within the virtual UE; and receiving, via the second cooperative UE, data based at least in part on selecting the second cooperative UE to replace the first cooperative UE.

Aspect 18: The method of aspect 17, further comprising: establishing a connection with a base station; receiving, from the base station and while operating as part of the virtual UE with the first cooperative UE, second data via the connection and the first cooperative UE.

Aspect 19: The method of aspect 18, further comprising: operating as part of the virtual UE with the second cooperative UE based at least in part on selecting the second cooperative UE to replace the first cooperative UE; and receiving, from the base station and while operating as part of the virtual UE with the second cooperative UE, third data via the connection and the second cooperative UE.

Aspect 20: The method of aspect 19, wherein operating as part of the virtual UE with the second cooperative UE comprises: establishing a second connection with the second cooperative UE based at least in part on selecting the second cooperative UE to replace the first cooperative UE; and disabling a first connection with the first cooperative UE based at least in part on establishing the second connection with the second cooperative UE.

Aspect 21: The method of any of aspects 17 through 20, further comprising: transmitting, to the first cooperative UE and based at least in part on selecting the second cooperative UE to replace the first cooperative UE, a message directing the first cooperative UE to initiate a beam management procedure for a base station serving the first cooperative UE.

Aspect 22: The method of aspect 21, further comprising: establishing a second connection with the second cooperative UE based at least in part on an indication that the second cooperative UE has selected a beam index during the beam management procedure; and disabling a first connection with the first cooperative UE after establishing the second connection with the second cooperative UE, wherein the second cooperative UE replaces the first cooperative UE within the virtual UE based at least in part on establishing the second connection and disabling the first connection.

Aspect 23: The method of any of aspects 17 through 22, further comprising: transmitting, to a base station that has a connection with the first cooperative UE and based at least in part on selecting the second cooperative UE to replace the first cooperative UE, a message to initiate a beam management procedure for the second cooperative UE.

Aspect 24: The method of any of aspects 17 through 23, wherein detecting the quality of the first signals comprises at least one of: receiving a first message comprising an indication of a quality of first signaling between the first cooperative UE and a base station that has a connection with the first cooperative UE; or performing measurements on first signaling between the first cooperative UE and the target UE.

Aspect 25: The method of aspect 24, wherein detecting the quality of the second signals comprises at least one of: receiving a second message comprising an indication of a quality of second signaling between the second cooperative UE and the base station; or performing measurements on second signaling between the second cooperative UE and the target UE.

Aspect 26: The method of any of aspects 17 through 23, wherein the first cooperative UE has a first connection with a first base station, the first signals comprise at least one of first signaling between the first cooperative UE and the first base station or second signaling between the first cooperative UE and the target UE, and the second signals comprise at least one of first signaling between the second cooperative UE and a second base station or second signaling between the second cooperative UE and the target UE.

Aspect 27: The method of aspect 26, wherein detecting the quality of the first signals comprises at least one of: receiving at least one of a first message comprising an indication of a quality of signals associated with the first cooperative UE and the first base station or a second message comprising an indication of a quality of signals associated with the second cooperative UE and the second base station; or performing measurements on at least one of first signaling received from the first cooperative UE or second signaling received from the second cooperative UE.

Aspect 28: The method of any of aspects 26 through 27, further comprising: transmitting, to the second cooperative UE, a message directing the second cooperative UE to initiate a random access procedure with the second base station based at least in part on selecting the second cooperative UE to replace the first cooperative UE.

Aspect 29: The method of any of aspects 26 through 28, further comprising: transmitting, to the first base station via the first cooperative UE and based at least in part on selecting the second cooperative UE to replace the first cooperative UE, a message indicating the quality of the first signaling between the first cooperative UE and the first base station and the quality of the first signaling between the second cooperative UE and the second base station.

Aspect 30: The method of aspect 29, further comprising: receiving, from the first base station via the first cooperative UE and in response to the message, a second message indicating that a handover procedure for the virtual UE from the first base station to the second base station has been initiated; transmitting, to the second cooperative UE and based at least in part on the second message, a third message directing the second cooperative UE to perform a random access procedure with the second base station; and receiving, from the second base station via the second cooperative UE, a fourth message indicating a completion of the handover procedure, wherein the data originates from the second base station and is received from the second cooperative UE based at least in part on the completion of the handover procedure.

Aspect 31: An apparatus for wireless communication at a second cooperative UE, comprising a processor; memory coupled with the processor; and instructions stored in the memory and executable by the processor to cause the apparatus to perform a method of any of aspects 1 through 9.

Aspect 32: An apparatus for wireless communication at a second cooperative UE, comprising at least one means for performing a method of any of aspects 1 through 9.

Aspect 33: A non-transitory computer-readable medium storing code for wireless communication at a second cooperative UE, the code comprising instructions executable by a processor to perform a method of any of aspects 1 through 9.

Aspect 34: An apparatus for wireless communication at a second cooperative UE, comprising a processor; memory coupled with the processor; and instructions stored in the memory and executable by the processor to cause the apparatus to perform a method of any of aspects 10 through 12.

Aspect 35: An apparatus for wireless communication at a second cooperative UE, comprising at least one means for performing a method of any of aspects 10 through 12.

Aspect 36: A non-transitory computer-readable medium storing code for wireless communication at a second cooperative UE, the code comprising instructions executable by a processor to perform a method of any of aspects 10 through 12.

Aspect 37: An apparatus for wireless communication at a first cooperative UE, comprising a processor; memory coupled with the processor; and instructions stored in the memory and executable by the processor to cause the apparatus to perform a method of any of aspects 13 through 16.

Aspect 38: An apparatus for wireless communication at a first cooperative UE, comprising at least one means for performing a method of any of aspects 13 through 16.

Aspect 39: A non-transitory computer-readable medium storing code for wireless communication at a first cooperative UE, the code comprising instructions executable by a processor to perform a method of any of aspects 13 through 16.

Aspect 40: An apparatus for wireless communication at a target UE, comprising a processor; memory coupled with the processor; and instructions stored in the memory and executable by the processor to cause the apparatus to perform a method of any of aspects 17 through 30.

Aspect 41: An apparatus for wireless communication at a target UE, comprising at least one means for performing a method of any of aspects 17 through 30.

Aspect 42: A non-transitory computer-readable medium storing code for wireless communication at a target UE, the code comprising instructions executable by a processor to perform a method of any of aspects 17 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a second cooperative user equipment (UE), comprising:
    receiving, from a target UE that forms a virtual UE with a first cooperative UE, an indication that the second cooperative UE has been selected to replace the first cooperative UE within the virtual UE, the first cooperative UE being served by a base station;
    selecting, during a beam management procedure and based at least in part on the second cooperative UE being selected, a beam for communicating with the base station; and
    relaying, based at least in part on selecting the beam, data received from the base station to the target UE.

2. The method of claim 1, further comprising:
    transmitting, to the base station and based at least in part on receiving the indication, a signal that causes the beam management procedure to be initiated at the base station.

3. The method of claim 1, further comprising:
    communicating, to the target UE, signaling associated with channel conditions for the second cooperative UE, wherein the indication that the second cooperative UE has been selected to replace the first cooperative UE received based at least in part on the channel conditions for the second cooperative UE.

4. The method of claim 3, wherein the signaling associated with the channel conditions for the second cooperative UE comprises at least one of:
    messaging associated with a quality of signals received at the second cooperative UE from the base station, or
    reference signals associated with a channel between the second cooperative UE and the target UE.

5. The method of claim 1, wherein selecting the beam comprises:
    selecting, during the beam management procedure, a second beam index that is different than a first beam index associated with communications between the first cooperative UE and the base station.

6. The method of claim 1, wherein selecting the beam comprises:
    selecting, during the beam management procedure, a beam index that is the same as a beam index associated with communications between the first cooperative UE and the base station.

7. The method of claim 1, wherein the beam management procedure comprises a beam failure recovery procedure.

8. The method of claim 1, further comprising:
    broadcasting an identity of the second cooperative UE, wherein the indication that the second cooperative UE has been selected is received based at least in part on the broadcasting; and
    operating as part of the virtual UE with the target UE based at least in part on being selected to replace the first cooperative UE.

9. The method of claim 1, wherein:
    a second beam for communicating with the base station is configured for the first cooperative UE and a third beam for communicating with the base station is configured for the target UE when the beam is selected by the second cooperative UE, and
    the second beam is disabled based at least in part on the beam being selected by the second cooperative UE.

10. A method for wireless communication at a second cooperative user equipment (UE), comprising:
    receiving, from a target UE that forms a virtual UE with a first cooperative UE, an indication that the second cooperative UE has been selected to replace the first cooperative UE within the virtual UE, the first cooperative UE served by a first base station;
    transmitting, to a second base station in a random-access channel and based at least in part on receiving the indication, a message associated with establishing a connection between the second base station and the second cooperative UE;
    establishing the connection with the second base station based at least in part on transmitting the message; and
    relaying, based at least in part on establishing the connection with the second base station, data received from the second base station to the target UE.

11. The method of claim 10, further comprising:
    communicating, to the target UE, signaling associated with channel conditions for the second cooperative UE, wherein the indication that the second cooperative UE has been selected to replace the first cooperative UE is received based at least in part on the channel conditions for the second cooperative UE.

12. The method of claim 11, wherein the signaling associated with communicating with the second base station comprises at least one of:
    messaging associated with a quality of signals received at the second cooperative UE from the second base station, or
    reference signals associated with a channel between the second cooperative UE and the target UE.

13. A method for wireless communication at a first cooperative user equipment (UE), comprising:
    receiving, from a target UE that forms a virtual UE with the first cooperative UE, an indication that a second cooperative UE has been selected to replace the first cooperative UE within the virtual UE, the first cooperative UE being served by a first base station;
    receiving, from the target UE, a first measurement of a quality of signals associated with the first cooperative UE and the first base station, a second measurement of a quality of signals associated with the second cooperative UE and a second base station, or both;

transmitting, to the first base station, a message comprising at least one of the first measurement or the second measurement;

receiving, from the first base station, an indication that a handover procedure to the second base station has been initiated for the target UE based at least in part on the message; and transmitting, to the target UE, the indication of the handover procedure.

14. The method of claim 13, further comprising:

relaying data received from the first base station to the target UE before receiving the indication that the second cooperative UE has been selected to replace the first cooperative UE.

15. The method of claim 13, wherein the message initiates a mobility management procedure or a beam management procedure based at least in part on receiving the indication that the second cooperative UE has been selected to replace the first cooperative UE.

16. The method of claim 13, further comprising:

receiving, based at least in part on the handover procedure being initiated, an indication that a second connection between the second cooperative UE and the second base station has been established; and disabling a first connection between the first cooperative UE and the first base station based at least in part on the indication that the second connection has been established.

17. A method for wireless communication at a target user equipment (UE), comprising:

operating as part of a virtual UE with a first cooperative UE;

detecting, while operating as part of the virtual UE with the first cooperative UE, a quality of first signals associated with the first cooperative UE and a quality of second signals associated with a second cooperative UE;

selecting, based at least in part on the detecting, the second cooperative UE to replace the first cooperative UE within the virtual UE; and receiving, via the second cooperative UE, data based at least in part on selecting the second cooperative UE to replace the first cooperative UE.

18. The method of claim 17, further comprising:
establishing a connection with a base station;

receiving, from the base station and while operating as part of the virtual UE with the first cooperative UE, second data via the connection and the first cooperative UE.

19. The method of claim 18, further comprising:

operating as part of the virtual UE with the second cooperative UE based at least in part on selecting the second cooperative UE to replace the first cooperative UE; and receiving, from the base station and while operating as part of the virtual UE with the second cooperative UE, third data via the connection and the second cooperative UE.

20. The method of claim 19, wherein operating as part of the virtual UE with the second cooperative UE comprises:

establishing a second connection with the second cooperative UE based at least in part on selecting the second cooperative UE to replace the first cooperative UE; and disabling a first connection with the first cooperative UE based at least in part on establishing the second connection with the second cooperative UE.

21. The method of claim 17, further comprising:

transmitting, to the first cooperative UE and based at least in part on selecting the second cooperative UE to replace the first cooperative UE, a message directing the first cooperative UE to initiate a beam management procedure for a base station serving the first cooperative UE.

22. The method of claim 21, further comprising:

establishing a second connection with the second cooperative UE based at least in part on an indication that the second cooperative UE has selected a beam index during the beam management procedure; and disabling a first connection with the first cooperative UE after establishing the second connection with the second cooperative UE, wherein the second cooperative UE replaces the first cooperative UE within the virtual UE based at least in part on establishing the second connection and disabling the first connection.

23. The method of claim 17, further comprising:

transmitting, to a base station that has a connection with the first cooperative UE and based at least in part on selecting the second cooperative UE to replace the first cooperative UE, a message to initiate a beam management procedure for the second cooperative UE.

24. The method of claim 17, wherein detecting the quality of the first signals comprises at least one of:

receiving a first message comprising an indication of a quality of first signaling between the first cooperative UE and a base station that has a connection with the first cooperative UE; or performing measurements on first signaling between the first cooperative UE and the target UE.

25. The method of claim 24, wherein detecting the quality of the second signals comprises at least one of:

receiving a second message comprising an indication of a quality of second signaling between the second cooperative UE and the base station; or performing measurements on second signaling between the second cooperative UE and the target UE.

26. The method of claim 17, wherein:

the first cooperative UE has a first connection with a first base station, the first signals comprise at least one of first signaling between the first cooperative UE and the first base station or second signaling between the first cooperative UE and the target UE, and the second signals comprise at least one of first signaling between the second cooperative UE and a second base station or second signaling between the second cooperative UE and the target UE.

27. The method of claim 26, wherein detecting the quality of the first signals comprises at least one of:

receiving at least one of a first message comprising an indication of a quality of signals associated with the first cooperative UE and the first base station or a second message comprising an indication of a quality of signals associated with the second cooperative UE and the second base station; or performing measurements on at least one of first signaling received from the first cooperative UE or second signaling received from the second cooperative UE.

28. The method of claim 26, further comprising:

transmitting, to the second cooperative UE, a message directing the second cooperative UE to initiate a random-access procedure with the second base station based at least in part on selecting the second cooperative UE to replace the first cooperative UE.

29. The method of claim 26, further comprising:
transmitting, to the first base station via the first cooperative UE and based at least in part on selecting the second cooperative UE to replace the first cooperative UE, a message indicating the quality of the first signaling between the first cooperative UE and the first base station and the quality of the first signaling between the second cooperative UE and the second base station.

30. The method of claim 29, further comprising:
receiving, from the first base station via the first cooperative UE and in response to the message, a second message indicating that a handover procedure for the virtual UE from the first base station to the second base station has been initiated;
transmitting, to the second cooperative UE and based at least in part on the second message, a third message directing the second cooperative UE to perform a random-access procedure with the second base station; and
receiving, from the second base station via the second cooperative UE, a fourth message indicating a completion of the handover procedure, wherein the data originates from the second base station and is received from the second cooperative UE based at least in part on the completion of the handover procedure.

* * * * *